US007235124B2

(12) United States Patent
Liu et al.

(10) Patent No.: US 7,235,124 B2
(45) Date of Patent: Jun. 26, 2007

(54) HIGH TEMPERATURE NANOFILTER, SYSTEM AND METHOD

(75) Inventors: Z. Gerald Liu, Madison, WI (US); Matthew P. Henrichsen, Evansville, WI (US); William C. Haberkamp, Cookeville, TN (US); Elaine M. Yorkgitis, St. Paul, MN (US); Robert K. Miller, Indianapolis, IN (US); Thomas E. Wood, Stillwater, MN (US); Zhongshu Tan, St. Paul, MN (US); Barry M. Verdegan, Stoughton, WI (US)

(73) Assignees: 3M Innovative Properties Company, St. Paul, MN (US); Cummins Filtration IP, Inc., Minneapolis, MN (US)

( * ) Notice: Subject to any disclaimer, the term of this patent is extended or adjusted under 35 U.S.C. 154(b) by 0 days.

(21) Appl. No.: 11/333,737

(22) Filed: Jan. 17, 2006

(65) Prior Publication Data

US 2006/0254426 A1 Nov. 16, 2006

Related U.S. Application Data

(60) Division of application No. 10/325,001, filed on Dec. 20, 2002, now Pat. No. 7,052,532, which is a continuation-in-part of application No. 09/935,847, filed on Aug. 23, 2001, now Pat. No. 6,582,490, which is a continuation-in-part of application No. 09/573,747, filed on May 18, 2000, now Pat. No. 6,444,006, said application No. 10/325,001 and a continuation-in-part of application No. PCT/US02/21333, filed on Jan. 25, 2002, and a continuation-in-part of application No. 10/075,035, filed on Feb. 12, 2002, is a continuation-in-part of application No. 09/522,152, filed on Mar. 9, 2000, now Pat. No. 6,669,913, and a continuation-in-part of application No. 09/851,300, filed on May 8, 2001, now Pat. No. 6,776,814.

(60) Provisional application No. 60/303,563, filed on Jul. 6, 2001.

(51) Int. Cl.
*B01D 53/04* (2006.01)

(52) U.S. Cl. .............................. 96/154; 55/523; 55/524; 55/527

(58) Field of Classification Search .......... 55/520–528, 55/DIG. 5; 96/153, 154; 977/831, 832, 977/963
See application file for complete search history.

(56) References Cited

U.S. PATENT DOCUMENTS 1,893,372 A 1/1933 Kryzanowsky (Continued)

FOREIGN PATENT DOCUMENTS

GB 563768 8/1944

(Continued)

OTHER PUBLICATIONS

"Design, Development and Performance of a Composite Diesel Particulate Filter", Miller et al, SAE Technical Paper Series 2002-01-0323, SAE 2002 World Congress, Mar. 4-7, 2002, pp. 1-16.*

(Continued)

*Primary Examiner*—Richard L. Chiesa
(74) *Attorney, Agent, or Firm*—Harold C. Knecht, III

(57) ABSTRACT

A filter, system and method is provided for filtering nanoparticles in a hot gas, namely particles <about 1 micron in a gas >about 200° C. and further particularly >about 450° C. including diesel exhaust. The filter includes filter media material composed of fibrous filter media having a plurality of fibers and granular filter media having a plurality of granules extending from the surfaces of the fibers. The filter is characterized by a permeability >about $3\times10^{-12}$ m$^2$ and an inertial resistance coefficient <about $1\times10^6$ m$^{-1}$. The filter captures particles in the Most Penetrating Region (MPR). A filter system includes a nanoparticle filter in series with a diesel exhaust treatment element.

20 Claims, 7 Drawing Sheets

U.S. PATENT DOCUMENTS

| | | | |
|---|---|---|---|
| 1,924,472 A | 8/1933 | Thomson | |
| 2,410,371 A | 10/1946 | Vokes | |
| 2,553,054 A | 5/1951 | Lincoln et al. | |
| 2,973,828 A * | 3/1961 | Engle | 96/118 |
| 3,025,964 A | 3/1962 | Summers et al. | |
| 3,112,184 A | 11/1963 | Hollenbach | |
| 3,308,853 A | 3/1967 | O'Brien | |
| 3,441,381 A | 4/1969 | Keith et al. | |
| 3,445,252 A | 5/1969 | MacDowell | |
| 3,664,095 A * | 5/1972 | Asker et al. | 96/154 |
| 3,692,184 A | 9/1972 | Miller, Jr. et al. | |
| 3,708,957 A | 1/1973 | Labadie | |
| 3,799,354 A | 3/1974 | Buckman et al. | |
| 3,800,515 A * | 4/1974 | Asker et al. | 96/154 |
| 3,844,749 A | 10/1974 | Carter, Sr. | |
| 3,899,555 A | 8/1975 | Takao et al. | |
| 3,966,646 A | 6/1976 | Noakes et al. | |
| 4,017,347 A | 4/1977 | Cleveland | |
| 4,028,252 A | 6/1977 | Morris | |
| 4,056,375 A | 11/1977 | Ringel et al. | |
| 4,073,655 A | 2/1978 | Li | |
| 4,130,487 A | 12/1978 | Hunter et al. | |
| 4,157,902 A | 6/1979 | Tokar | |
| 4,276,071 A | 6/1981 | Outland | |
| 4,398,931 A | 8/1983 | Shevlin | |
| 4,410,427 A | 10/1983 | Wydeven | |
| 4,419,108 A | 12/1983 | Frost et al. | |
| 4,430,223 A | 2/1984 | Miyakawa et al. | |
| 4,441,899 A | 4/1984 | Takagi et al. | |
| 4,455,823 A | 6/1984 | Bly et al. | |
| 4,485,621 A | 12/1984 | Wong et al. | |
| 4,498,989 A | 2/1985 | Miyakawa et al. | |
| 4,510,193 A * | 4/1985 | Blucher et al. | 428/196 |
| 4,512,147 A | 4/1985 | Wong | |
| 4,542,286 A | 9/1985 | Golarz | |
| 4,548,626 A | 10/1985 | Ackley et al. | |
| 4,589,983 A | 5/1986 | Wydevan | |
| 4,608,361 A | 8/1986 | Kanamori et al. | |
| 4,619,675 A | 10/1986 | Watanabe | |
| 4,652,286 A | 3/1987 | Kusuda et al. | |
| 4,712,643 A | 12/1987 | Iles et al. | |
| 4,718,926 A | 1/1988 | Nakamoto et al. | |
| 4,818,729 A | 4/1989 | Perrotta et al. | |
| RE33,118 E | 11/1989 | Scheitlin et al. | |
| 4,878,929 A | 11/1989 | Tofsland et al. | |
| 4,902,487 A | 2/1990 | Cooper et al. | |
| 4,925,561 A | 5/1990 | Ishii et al. | |
| 4,960,449 A | 10/1990 | Yonushonis | |
| 5,008,086 A | 4/1991 | Merry | |
| 5,014,509 A | 5/1991 | Broering et al. | |
| 5,015,376 A | 5/1991 | Picek | |
| 5,030,263 A | 7/1991 | Kemp | |
| 5,035,236 A | 7/1991 | Kanegaonkar | |
| 5,042,249 A | 8/1991 | Erdmannsdoerfer | |
| 5,052,178 A | 10/1991 | Clerc et al. | |
| 5,063,736 A | 11/1991 | Hough et al. | |
| 5,075,160 A | 12/1991 | Stinton et al. | |
| 5,082,479 A | 1/1992 | Miller | |
| 5,106,397 A | 4/1992 | Jaroszczyk et al. | |
| 5,137,696 A | 8/1992 | Hitachi et al. | |
| 5,174,895 A | 12/1992 | Drori | |
| 5,194,078 A | 3/1993 | Yonemura et al. | |
| 5,196,120 A | 3/1993 | White | |
| 5,196,170 A | 3/1993 | Patashnick et al. | |
| 5,207,807 A | 5/1993 | Manfre et al. | |
| 5,250,476 A | 10/1993 | Mogensen et al. | |
| 5,252,299 A | 10/1993 | Retallick | |
| D342,990 S | 1/1994 | Jaroszczyk | |
| 5,298,046 A | 3/1994 | Peisert | |
| 5,304,351 A | 4/1994 | Tanaka et al. | |
| 5,322,537 A | 6/1994 | Nakamura et al. | |
| 5,328,758 A * | 7/1994 | Markell et al. | 442/351 |
| 5,346,675 A | 9/1994 | Usui et al. | |
| 5,376,218 A | 12/1994 | Mito et al. | |
| 5,380,501 A | 1/1995 | Hitachi et al. | |
| 5,385,873 A | 1/1995 | MacNeill | |
| 5,395,428 A * | 3/1995 | von Blucher et al. | 95/104 |
| 5,456,069 A | 10/1995 | Haerle | |
| 5,468,384 A | 11/1995 | Garcera et al. | |
| 5,480,621 A | 1/1996 | Breuer et al. | |
| 5,486,410 A * | 1/1996 | Groeger et al. | 442/323 |
| 5,505,769 A * | 4/1996 | Dinnage et al. | 96/153 |
| 5,546,069 A | 8/1996 | Holden et al. | |
| 5,549,722 A | 8/1996 | Zemaitis et al. | |
| 5,562,825 A | 10/1996 | Yamada et al. | |
| 5,567,536 A | 10/1996 | Lintz et al. | |
| 5,611,832 A | 3/1997 | Suzuki et al. | |
| 5,632,792 A | 5/1997 | Haggard | |
| 5,662,728 A * | 9/1997 | Groeger | 96/153 |
| 5,682,740 A * | 11/1997 | Kawamura | 60/297 |
| 5,772,883 A | 6/1998 | Rothman et al. | |
| 5,792,247 A | 8/1998 | Gillingham et al. | |
| 5,820,646 A | 10/1998 | Gillingham et al. | |
| 5,846,276 A | 12/1998 | Nagai et al. | |
| 5,846,641 A | 12/1998 | Abeles et al. | |
| 5,863,311 A | 1/1999 | Nagai et al. | |
| 5,876,537 A | 3/1999 | Hill et al. | |
| 5,876,637 A | 3/1999 | Martin | |
| 5,891,402 A | 4/1999 | Sassa et al. | |
| 5,895,574 A | 4/1999 | Friedmann et al. | |
| 5,902,364 A | 5/1999 | Tokar et al. | |
| 5,908,480 A | 6/1999 | Ban et al. | |
| 5,925,561 A | 7/1999 | Posselius, Jr. et al. | |
| 5,961,931 A | 10/1999 | Ban et al. | |
| 6,093,378 A | 7/2000 | Deeba et al. | |
| 6,099,901 A * | 8/2000 | Cronia et al. | 427/244 |
| 6,101,793 A | 8/2000 | Nagai et al. | |
| 6,146,451 A * | 11/2000 | Sakata et al. | 96/135 |
| 6,238,561 B1 | 5/2001 | Liu et al. | |
| 6,245,301 B1 | 6/2001 | Stroom et al. | |
| 6,294,141 B1 | 9/2001 | Twigg et al. | |
| 6,413,303 B2 * | 7/2002 | Gelderland et al. | 96/135 |
| 6,444,006 B1 * | 9/2002 | Haberkamp et al. | 55/521 |
| 6,510,686 B2 | 1/2003 | Kimura et al. | |
| 6,568,178 B2 | 5/2003 | Hirota et al. | |
| 6,582,490 B2 * | 6/2003 | Miller et al. | 55/520 |
| 6,594,991 B2 | 7/2003 | Itoh et al. | |
| 6,669,913 B1 * | 12/2003 | Haberkamp | 422/180 |
| 6,776,814 B2 | 8/2004 | Badeau et al. | |
| 7,052,532 B1 * | 5/2006 | Liu et al. | 96/154 |
| 2001/0027645 A1 | 10/2001 | Itoh et al. | 60/288 |
| 2001/0027646 A1 * | 10/2001 | Kimura et al. | 60/297 |
| 2001/0027647 A1 * | 10/2001 | Hirota et al. | 60/297 |
| 2002/0090324 A1 * | 7/2002 | Badeau et al. | 422/171 |
| 2003/0190269 A1 * | 10/2003 | Liu et al. | 422/168 |

FOREIGN PATENT DOCUMENTS

| | | | | |
|---|---|---|---|---|
| JP | 2-53442 | | 2/1990 | |
| JP | 2-79024 | | 3/1990 | |
| JP | 4-161213 | * | 6/1992 | 96/154 |
| JP | 9-125931 | | 5/1997 | |
| JP | 2001-200715 | | 7/2001 | |
| JP | 2001-342818 | | 12/2001 | |
| WO | WO 88/03431 | | 5/1988 | |

OTHER PUBLICATIONS

OTHER PUBLICATIONS

Alcala, M. D. et al., J. Am. Ceram. Soc., 79[6]. "A New 'Incipient-Wetness' Method for the Synthesis of Chemically Stabilized β-Cristobalite", pp. 1681-1684, 1996.

ASTM D737-75 "Standard Test Method for Air Permeability of Textile Fabrics", ASTM International, pp. 1-5, (undated).

Bruner, "Test Equipment and Methods at the 3M Company Diesel Filter Products Laboratory", SAE Paper 950516, pp. 1-12 (1995).

Davies, C. N., Journal of Aerosol Science, "Filtration of Aerosols", vol. 14, No. 2, pp. 147-161, 1983.

Kirk-Othmer Encyclopedia of Chemical Technology, 4th Edition, John Wiley and Sons, New York, NY, vol. 6, No. 2, pp. 405, 1993.

Lee, "Characterization of Chemically Stabilized β-Cristobalite Synthesized by Solution-Polymerization Route", Korean J. Ceramics, vol. 3, No. 2, pp. 116-123 (1997).

Lee et al., "Critical Size Effect for Chemically doped β-Cristobalite Transformation", Materials Letters, vol. 45, pp. 175-179, Sep. 2000.

Liu et al., "Measuring the Fractional Efficiency of Diesel Particulate Filters" SAE Technical Paper 2002-01-1007, pp. 1-9, Mar. 2002.

Liu, Z.G., "Numerical Investigation of Particle Filtration Process in Fibrous Filters", Ph.D. Thesis, University of Wisconsin-Madison, 1993.

Mihara, T. et al., Central Research Library, Matsushita Electric Industrial Co., Ltd. No. 860010, "Diesel Particulate Trap of Corrugated Honeycomb Fabricated with Mullite Fiber Ceramics", pp. 31-39, (undated).

Miller, R. K. et al., SAE Technical Paper Series 2002-01-0323, SAE 2002 World Congress, "Design, Development and Performance of a Composite Diesel Particulate Filter", Mar. 4-7, 2002, pp. 1-16.

Perotta, et al., "Chemical Stabilization of β-Cristobalite", J. Am. Ceram. Soc., vol. 72, No. 3, pp. 441-447, 1989.

Saltzberg et al., "Synthesis of Chemically Stabilized Cristobalite", J. Am. Ceram. Soc., vol. 75, No. 1, pp. 85-95, 1992.

Shustorovich et al., Monolithic Metal Oxide Thin-Wall Substrates with Closed and Open Cells: Optimal Designs by Theoretical Modeling and Experiment, SAE 2001 World Congress, Mar. 5-8, 2001.

Thomas et al., "Further Investigation of the Stabilization of β-Cristobalite", J. Am. Ceram. Soc. vol. 77, No. 1, pp. 49-56, 1994.

Warheit, D. et al., Pulmonary Toxicity of Perfluropolymer Fumes, Academic Press, "Attenuation of Perfluoropolymer Fume Pulmonary Toxicity: Effect of Filters, Combustion Method and Aerosol Age", pp. 309-329, 1990.

* cited by examiner

- □ after 10 min.
- △ after 14 min.
- ○ after 18 min.
- ◆ after 22 min.

- ■ Composite
- ▲ Cordierite

HIGH TEMPERATURE NANOFILTER, SYSTEM AND METHOD

This patent application is a divisional application of U.S. patent application Ser. No. 10/325,001 filed on Dec. 20, 2002, now U.S. Pat. No. 7,052,532, which is a continuation-in-part of U.S. patent application Ser. No. 09/935,847, filed Aug. 23, 2001, now U.S. Pat. No. 6,582,490, which is a continuation-in-part of U.S. patent application Ser. No. 09/573,747, filed May 18, 2000, now U.S. Pat. No. 6,444,006, and a continuation-in-part of International Patent Application No. PCT/US02/21333, Jan. 25, 2002, now Publication No. WO03/004438, claiming priority from provisional U.S. Patent Application No. 60/303,563, filed Jul. 6, 2001, and a continuation-in-part of U.S. patent application Ser. No. 10/075,035 now U.S. Patent Publication No. US2003/0190269 A1 filed Feb. 12, 2002, which is a continuation-in-part of U.S. patent application Ser. No. 09/522,152, now U.S. Pat. No. 6,669,913 filed Mar. 9, 2000, and a continuation-in-part of U.S. patent application Ser. No. 09/851,300, now U.S. Pat. No. 6,776,814, filed May 8, 2001, all incorporated herein by reference and from which priority is claimed.

FIELD, BACKGROUND AND SUMMARY

The invention relates to high temperature filters, including diesel exhaust filters.

The present invention provides a filter and method for filtering nanoparticles in a hot gas, namely particles <1 micron in a gas >200° C. and further particularly greater than 450° C. including diesel exhaust. Advances are made in permeability, namely >$3 \times 10^{-12}$ m$^2$ and inertial resistance coefficient <$1 \times 10^6$ m$^{-1}$, and in particle capture in the MPR (Most Penetrating Region), and in staged filtration.

DETAILED DESCRIPTION OF THE INVENTION

Figure 1:
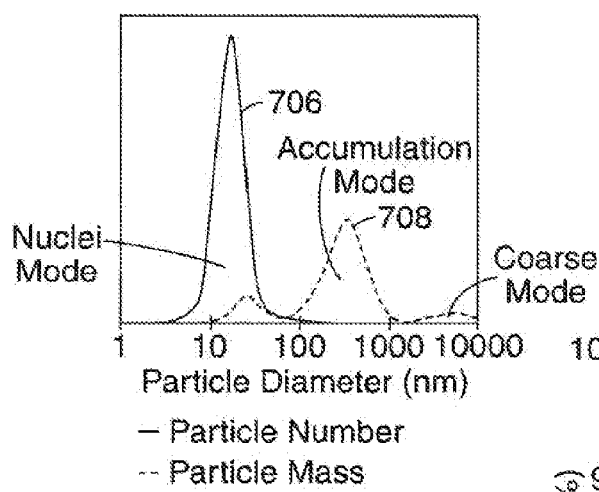
FIG. 1 is a graph of particle distribution of diesel exhaust, namely particle number and particle mass vs. particle diameter.

A filter is provided for diesel exhaust and hot gas applications for enhanced control of particles in the nanoparticle (<about 1 micron) size range. A hybrid or composite fibrous-granular (including fibrous-particulate) filter material has a permeability of >about $3 \times 10^{-12}$ m$^2$ and an inertial resistance coefficient <about $1 \times 10^6$ m$^{-1}$. The fiber substrate provides high porosity for reduced pressure drop and increased contaminant loading (capacity), plus provides a support network for a binder to obtain increased strength in a rigidified filter for high flow velocities and temperatures of diesel exhaust and hot gas filtration. A granular or particulate binder holds the structure together, increases surface area, and provides collectors less than about 5 μm (micron) in size to facilitate nanoparticle filtration. The hybrid material can be like the filter materials disclosed in U.S. patent application Ser. No. 09/935,847, filed Aug. 23, 2001, now U.S. Pat. No. 6,582,490, or International Patent Application No. PCT/US02/21333, filed Jul. 3, 2002, now International Patent Publication No. WO03/004438, exhibiting characteristics of granular structures and fibrous structures. An oxidization catalyst may be provided with the hybrid fibrous-granular filter material to reduce the concentration of gaseous contaminants that condense into nanoparticles at ambient temperature. In further embodiments, the hybrid material is used in combination with other DPF (diesel particulate filter) or DOC (diesel oxidization catalyst) elements to control nanoparticles in diesel exhaust and hot gas emissions.

It is advantageous to reduce not only the mass concentration of diesel particle emissions, as is currently done, but also the number concentration of these particles, particularly in the nanoparticle size range, i.e. submicron, which are not readily removed by settling, i.e. it is desired to reduce not only the mass of the particles but also the number of particles.

DPFs are required for engine particle emission control in order to meet tightening environmental regulations. Most notable among the DPFs in use today are extruded monolithic filters made of densely packed, granular porous structures of cordierite or silicon carbide (SiC). These filters utilize surface filtration through cake formation to remove diesel particulate emissions. Diesel particles are deposited on the surface of the filter media. As the cake or contaminant layer builds in thickness, filtration efficiency improves. In order to achieve high filtration efficiency and maintain structural integrity at the high temperatures (>about 200° C., and including >about 450° C. for diesel aftertreatment) and flow velocities (Reynolds Number >about 200) typical of diesel exhaust and hot gas filtration, a low porosity of about 50% is typical and is limited by the countervailing need to maintain structural integrity. That is, there is a trade-off between porosity and structural integrity in these types of filters. The need for structural integrity limits the porosities to lower values than otherwise desired. The high temperatures, particularly during regeneration of diesel particulate filters, necessitates the use of materials, such as ceramics or other suitable inorganic materials, able to withstand temperature excursions in excess of about 350 to 450° C. As a result, these DPFs are characterized by relatively high flow restriction and large thermal mass.

Particulate emissions from diesel engines have a tri-modal distribution pattern, with the largest number in the nuclei-mode as shown in solid line at 706 in FIG. 1, and the greatest mass in the accumulation-mode, as shown in dashed line at 708 in FIG. 1. To control filtering of coarse particles larger than about 1 µm and nanoparticles smaller than about 1 µm, it is preferred that filter materials be composed of both fine and nanosized collectors, preferably ceramic fibers or particles. This can give increased surface area and roughness desired for nanofiltration.

Filtration mechanisms have been reviewed and summarized by Liu, "Numerical Investigation of Particle Filtration Process in Fibrous Filters", Z. G. Liu Ph.D. Thesis, University of Wisconsin-Madison, 1993. Diffusion is largely responsible for collecting particles <about 200 nm (nanometers). In addition to diffusion, collection of these particles can be attributed to van der Waals attraction and other possible forces, such as diffusiophoresis, thermophoresis, and electrostatic force. Diffusion efficiency can be enhanced by minimizing the diffusion distance and maximizing the collecting surface area. This can be achieved by utilizing both fine and nanosized collectors, e.g. ceramic fibers and particles, in the filters. The effect of diffusion decreases as the size of particles increases. For particles larger than about 200 nm, this effect becomes negligible, "Filtration of Aerosols", C. N. Davies, Journal of Aerosol Science, Vol. 14, No. 2, pgs. 147-161, 1983.

Figure 2:
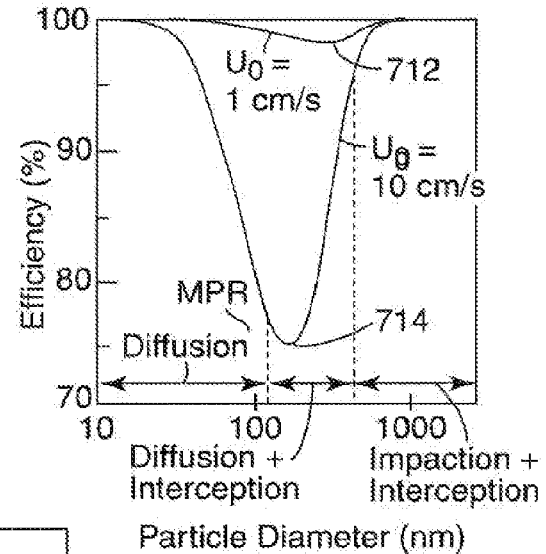
FIG. 2 is a graph of filter collection efficiency vs. particle diameter.

Coarse particles are collected by interception and inertial impaction filtration mechanisms. These mechanisms can be described using a single fiber or a single sphere model. In such models, there exists a critical particle trajectory plane within which particles are captured by interception and/or inertial impaction, and outside of which there is no particle capture. The filtration efficiency is inversely related to the size of the filtering material. While inertial impaction is effective for removing coarse particles greater than about 2 microns, i.e. 2000 nm, FIG. 2, it becomes less effective as the particle size decreases to below about 1 micron, i.e. 1000 nm, so that interception and diffusion become the dominant filtration mechanisms. With further decreasing particle size, i.e. moving leftwardly in FIG. 2, interception becomes less effective, and diffusion is the dominant filtration mechanism. This is shown in FIG. 2 which illustrates efficiency as a function of particle size. FIG. 2 further illustrates the effect with increasing flow velocity, e.g. from $U_0$=1 cm/second (centimeter per second) to $U_0$=10 cm/second, where $U_0$ is face velocity, namely the flow velocity at the face of the media, perpendicular thereto.

There is a range of particle size corresponding to the accumulation mode in FIG. 1 where none of the above noted filtration mechanisms have a dominant effect on suspended diesel particles in the exhaust gas, i.e. all of the noted filtration mechanisms have a drop in efficiency. This low efficiency gap is shown at 712 and 714 in FIG. 2, and is known in the prior art as the MPR (Most Penetrating Region) in the noted efficiency profile in a plot of particle number efficiency vs. size of the particles. The Most Penetrating Region (MPR) is defined as the particle size range between about 50 and 500 nanometers (nm). The minimum filtration efficiency can be improved by decreasing the collector size, increasing surface roughness, and/or increasing the filter surface area, i.e. as fiber, particle or grain is decreased, the depth of the trough at 712 or 714 is decreased, and the collection efficiency percentage at such points becomes greater. Filter efficiency increases with either decreasing fiber size or decreasing grain or particle size.

Figure 3:
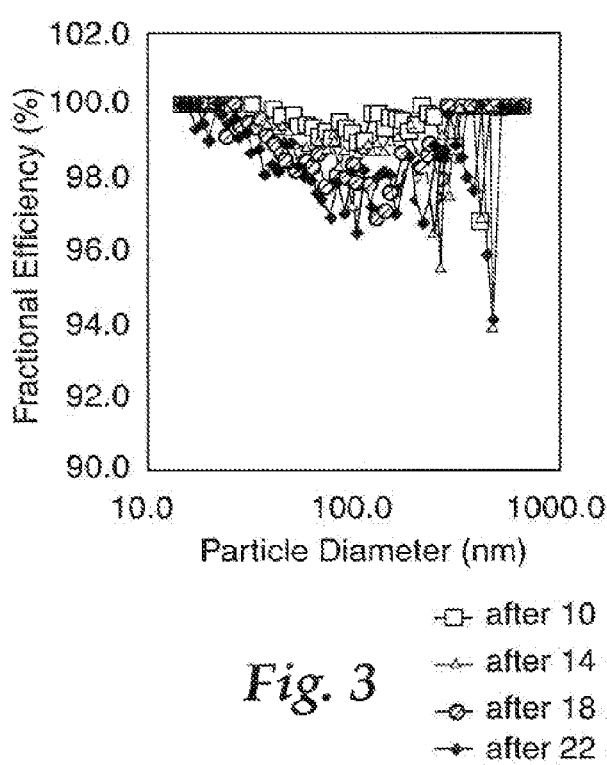
FIG. 3 is a graph of efficiency versus particle diameter.
Figure 4:
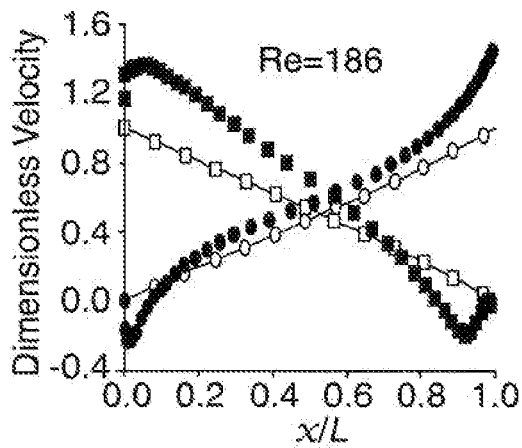
FIGS. 4-9 show velocity profiles of exhaust flow through a diesel particulate filter, and are graphs of velocity vs. axial location along the length of the filter.
Figure 5:
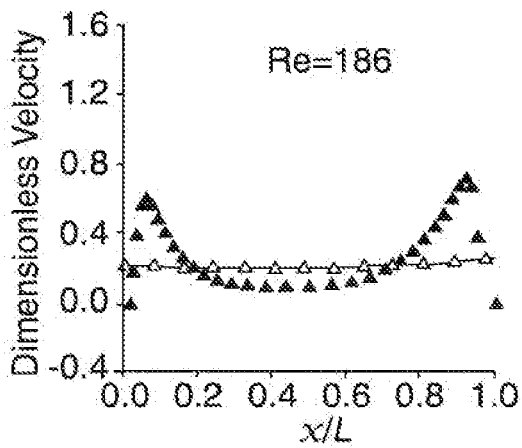
Figure 6:
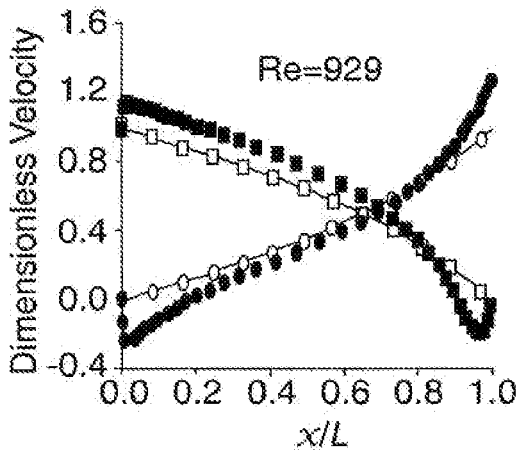
Figure 7:
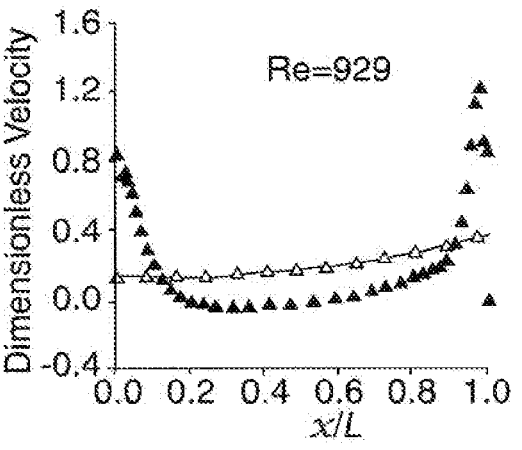
Figure 8:
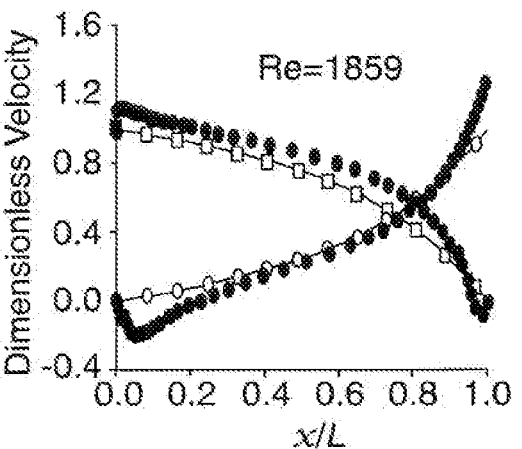
Figure 9:
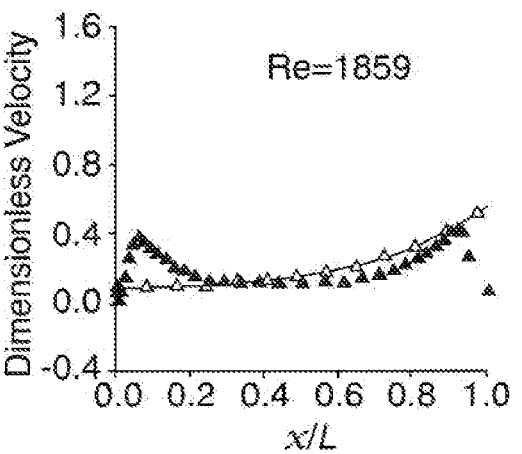

Traditional cordierite and SiC monolithic DPFs utilize granular collectors, wherein the collectors are not fibers. In the present application, ideally, a large pore size is preferred for high media permeability and storage capacity, while fine granular particles are preferred for efficient collection of nanoparticles. Since a decrease in grain size and porosity increases the flow restriction, and decreases storage capacity and increases removal efficiency, there is a fundamental limitation and trade-off to simultaneous optimization of these performance parameters using granular-only media, e.g. cordierite. These filters rely on the soot cake for removal of containment particles, i.e. most contaminant removal occurs within the contaminant cake that builds up on the surface of the filter. As a result, particle removal efficiency changes with time and the thickness of the cake. Thus, removal efficiency increases with time as the soot cake builds, but decreases with time during filter regeneration when the soot is burned off as shown in FIG. 3. FIG. 3 shows the fractional efficiency of a 200 cpsi (cells per square inch) cordierite filter with a 10.5 inch diameter, 12 inch length, 1 millimeter channel width, and 159 square feet of wall face area during ISO Mode 6 (International Standards Organization ISO 8178-4: 1996, "Reciprocating Internal Combustion Engine-Exhaust Emission Measurement Cycles For Different Engine Applications"). The filter was loaded for a total of 100 minutes during testing at four previous Modes (namely Modes 8, 1, 6, 11), and then the flow conditions were allowed to stabilize for ten minutes at Mode 6. Fractional efficiency data was then collected every four minutes starting at this ten minute time and ending 22 minutes later. During such time, the soot laden DPF was regenerating, and the data shows a noticeable decline in removal efficiency. This reduction in efficiency is undesirable in filters intended to control nanoparticle emission. In contrast, fibrous filters do not suffer the trade-off between removal efficiency, restriction, and storage capacity. Fibers of much finer size than a typical grain of cordierite or silicon carbide can be packed to allow a large pore size (high pore size, low packing density) and high media permeability, providing lower restriction and increased storage capacity and higher efficiency than granular media. However, fibers this fine do not provide adequate structural support for the media structure.

In the present invention, a hybrid material is used, containing both fibers and granular particles to solve the above noted problems. The granular particles are preferably distributed relatively uniformly throughout the hybrid material with respect to the axial, lateral and depth direction, though non-uniform particle distribution may also be acceptable, including lower or higher concentrations of granular particles at or near the surface of the hybrid material. It may be desirable to have lower concentrations near the surface to enhance depth filtration. It may be desirable to have higher concentrations near the surface to enhance surface filtration. It may also be desirable to have a controlled concentration gradient (e.g., stepped, smoothly increasing or decreasing) of granular particles to obtain the desired filtration characteristics. The material accomplishes nanoparticle filtration and resulted from continuing development work from the above noted applications in the above noted sections. Such further work has defined structural features necessary or desirable to enhance nanoparticle control in diesel emission and hot gas filtration applications. Such work has been applied to control diesel particulate emissions including in combinations of structures optimizing nanoparticle control, including not only nanoparticles generated within diesel engines, but also nanoparticles formed by oxidation of $SO_x$ or $NO_x$, and by condensation of volatile organic compounds upon cooling. Sulfates form by oxidation of $SO_x$. Nitrates form by oxidation of $NO_x$ The noted work has further developed nanoparticle control involving not only filtering out nanoparticles but also reducing the concentrations of volatiles and other chemicals that are precursors to nanoparticles.

The hybrid filter is composed of fibrous and granular portions. The paper/fibrous structure portion gives high porosity, while the binder/particulate portion rigidifies the part, adds strength, and significantly increases surface area and roughness. Fibrous media for diesel exhaust application is known in the prior art, for example sintered fibrous media as disclosed in U.S. Pat. Nos. 4,652,286, 5,322,537, and in SAE Paper 860010 "Diesel Particulate Trap of Corrugated Honeycomb Fabricated with Mullite Fiber Ceramics", Mihara et al, SAE 1986 International Congress and Exposition, Detroit, Mich., Feb. 24-28, 1986. The Mihara et al type filter was considered for the present application, however in order to meet the stringent durability requirements of a diesel exhaust application, high binder concentrations were found to be necessary, which in turn lowered BET (Brunauer Emmett Teller) surface area. In contrast, nanofiltration in the present application can be provided by a depth filter having high porosity, high permeability, high pore size, low density, high surface roughness, and high internal surface area (e.g. BET media surface). The combination of acceptable durability and high surface roughness and internal surface area for nanofiltration of diesel exhaust is a significant advance over the art.

The pressure drop and the initial loading of the present hybrid material were analyzed and numerically modeled. The results were also validated experimentally.

For the analytical model, the following equations were used for the hybrid material:

$$\frac{\partial (\rho v_i)}{\partial x} = (-1)^i \left(\frac{4\sqrt{3}}{b}\right) \rho v_w, \quad (1)$$

$$\frac{\partial}{\partial x}(\rho v_i^2) = -\frac{\partial p_i}{\partial x} - \frac{1}{2} cf_i \mu \frac{v_i}{d_h^2}, \quad (2)$$

$$f_i = \frac{1}{16}\left[0.0481 + \frac{0.0494}{(Re_w + 4.7)^{0.8}}\right]^{-1}, \quad (3)$$

$$-\nabla p = \frac{\mu v_w}{\alpha} + \frac{1}{2}\beta \rho v_w^2, \quad (4)$$

where i=1, 2 with 1 representing an inlet channel and 2 representing an outlet channel, respectively, and using the following nomenclature:

b: side width of equilateral triangle, m
c: parameter for equilateral triangular channel flow
$f_i$: inlet and outlet channel correction factors
p: pressure, Pa
$\bar{p}$: dimensionless pressure
$\Delta p$=pressure drop of the filter
$Re_w$: wall flow Reynolds number
$v_x$: x-directional velocity component, m/s
$v_y$: y-directional velocity component, m/s
$v_z$: z-directional velocity component, m/s
$v_1$: inlet channel axial velocity, m/s
$v_2$: outlet channel axial velocity, m/s
$v_w$: wall flow velocity, m/s
$\bar{v_1}$: dimensionless inlet channel velocity
$\bar{v_2}$: dimensionless outlet channel velocity
$\bar{v_w}$: dimensionless wall flow velocity
$w_1$: porous wall thickness, m
$\alpha$: permeability of porous wall, m$^2$ $\beta$: inertia resistance coefficient of porous wall, $$\frac{1}{m}$$

$\mu$: exhaust dynamic viscosity, $$\frac{kg \cdot m}{s}$$

$\rho$: exhaust gas density, kg/m$^3$
Re: channel Reynolds number, $$\frac{v_0 d_k}{v}$$

A: cross-sectional area of triangular channel, m$^2$
$d_h$: channel hydraulic diameter, $$\frac{4A}{S}, m$$

h: triangular channel height,
L: channel length, m
S: wetted channel perimeter, 3b, m
$v_0$: characteristics channel velocity, m/s
$\lambda$: exhaust gas mean free path, m
$v$: exhaust kinematic viscosity, m/s$^2$ $$\gamma = \frac{1}{8}\frac{\alpha \beta}{L}Re,$$

$$C_1 = 12\left(\frac{\alpha}{bw_t}\right)\left(\frac{L}{b}\right)Re,$$

$$C_2 = 6\sqrt{3}\,Cf_1\left(\frac{\alpha}{bw_t}\right)\left(\frac{L}{b}\right)^2,$$

$$C_3 = 6\sqrt{3}\,Cf_2\left(\frac{\alpha}{bw_t}\right)\left(\frac{L}{b}\right)^2.$$

The non-dimensional pressure drop is then calculated with the following equation:

$$\Delta \bar{p}_{channel} = \bar{p_1}(0) - \bar{p_2}(1) = \bar{p_2}(0) + \Delta \bar{p}(0) - \bar{p_2}(1) \quad (5)$$

$$= C_1 + C_3 \int_0^1 \bar{v_2}(\bar{x})d\bar{x} + \bar{v_w}(0) + \gamma \bar{v_w^2}(0).$$

The numerical model is based on the technique of computational fluid dynamics. The flow fields and pressure distributions of the porous channel flows are computed numerically by solving the following continuity and Navier-Stokes equations expressed in Cartesian coordinates:

$$\frac{\partial v_x}{\partial x} + \frac{\partial v_y}{\partial y} + \frac{\partial v_z}{\partial z} = 0, \quad (6)$$

-continued $$v_x \frac{\partial v_x}{\partial x} + v_y \frac{\partial v_x}{\partial y} + v_z \frac{\partial v_x}{\partial z} = -\frac{1}{\rho}\frac{\partial p}{\partial x} + \frac{\mu}{\rho}\left(\frac{\partial^2 v_x}{\partial x^2} + \frac{\partial^2 v_x}{\partial y^2} + \frac{\partial^2 v_x}{\partial z^2}\right), \quad (7)$$

$$v_x \frac{\partial v_y}{\partial x} + v_y \frac{\partial v_y}{\partial y} + v_z \frac{\partial v_y}{\partial z} = -\frac{1}{\rho}\frac{\partial p}{\partial y} + \frac{\mu}{\rho}\left(\frac{\partial^2 v_y}{\partial x^2} + \frac{\partial^2 v_y}{\partial y^2} + \frac{\partial^2 v_y}{\partial z^2}\right), \quad (8)$$

$$v_x \frac{\partial v_z}{\partial x} + v_y \frac{\partial v_z}{\partial y} + v_z \frac{\partial v_z}{\partial z} = -\frac{1}{\rho}\frac{\partial p}{\partial z} + \frac{\mu}{\rho}\left(\frac{\partial^2 v_z}{\partial x^2} + \frac{\partial^2 v_z}{\partial y^2} + \frac{\partial^2 v_z}{\partial z^2}\right), \quad (9)$$

where $v_x$, $v_y$, $v_z$ are x, y, and z directional velocity components, respectively. The porous walls are simulated with the following equation:

$$-\nabla p = \frac{\mu v_w}{\alpha} + \frac{1}{2}\beta \rho v_w^2. \quad (10)$$

The permeability α and the inertial resistance coefficient β of the hybrid material were obtained through experiment, and, in equations (4) and (10), are functions of the characteristics of the filter media. Permeability is the conductivity of a porous media with respect to permeation by a Newtonian fluid. It is an increasing function of porosity (high for fibrous media). The inertial resistance coefficient is a correction factor to account for dynamic pressure drop due to high velocity. It is related to media properties, e.g. porosity, pore connectivity, surface roughness, surface area, etc., and is low for fibrous media.

Figure 10:
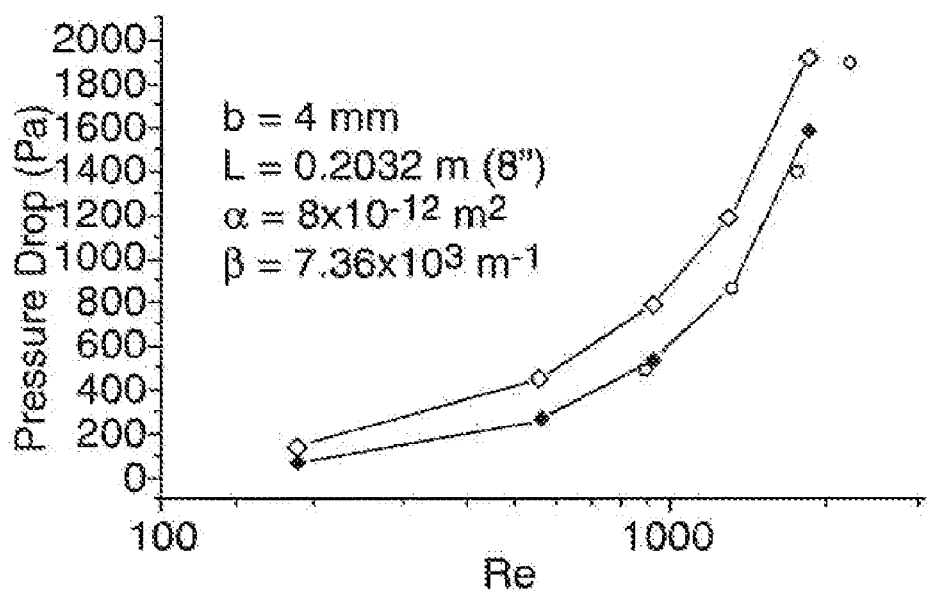
FIG. 10 is a graph of pressure drop vs. Reynolds number.

FIGS. 4-9 show non-dimensional distributions of inlet channel, outlet channel, and wall flow velocities (initial soot loading patterns) at different Reynolds numbers. The figures show predicted velocity profiles at the inlet side, outlet side, and through-wall (i.e. wall-flow) as a function of axial location x along the length L of a hybrid media diesel particulate spiral-wound filter for various Reynolds numbers. The hollow squares are analytical inlet channel velocity. The solid squares are numerical inlet channel velocity. The hollow circles are analytical outlet channel velocity. The solid circles are numerical outlet channel velocity. The hollow triangles are analytical wall-flow velocity. The solid triangles are numerical wall-flow velocity. The two models show good agreement in terms of the velocity profiles. Of note are the wall-flow velocity results which show that soot loading will be greatest at the ends of the channels. In FIG. 10, the models are compared to experimental results by showing the pressure drop of a diesel particulate spiral-wound filter made of the hybrid material as a function of Reynolds numbers. FIG. 10 shows a comparison of pressure drop across a hybrid diesel particulate filter as a function of Reynolds number obtained using the analytical model, the numerical model, and experimental results. The hollow diamonds in FIG. 10 are analytical pressure drop. The solid diamonds in FIG. 10 are numerical pressure drop. The hollow circles in FIG. 10 are experimental pressure drop. While both models predict similar trends, the analytical model is in better quantitative agreement with the experimental results.

Figure 11:
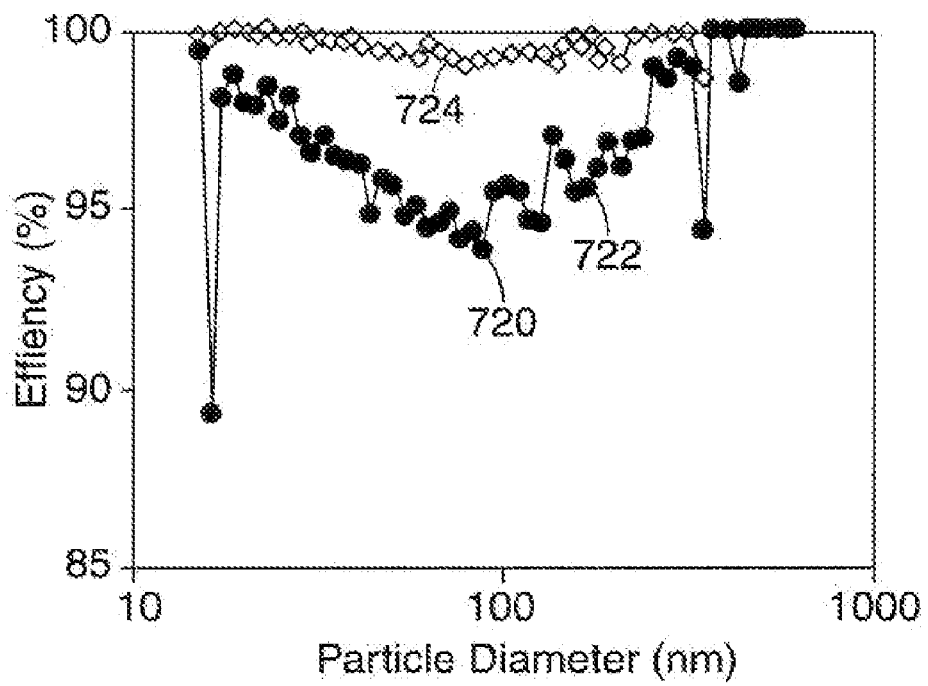
FIGS. 11-16 are graphs of fractional particle number collection efficiency vs. particle diameter.

FIG. 11 is a comparison of the fractional efficiency of a hybrid diesel particulate filter in accordance with the present invention (hollow diamonds) and a 100 cpsi (cells per square inch) cordierite diesel particulate filter (solid circles) at ISO (International Standards Organization) Mode 8. The hybrid filter had a 10.5 inch diameter, 9 inch length, 3 millimeter pleat height, and 74 square feet of wall surface area. The 100 cpsi cordierite filter had a 10.5 inch diameter, 12 inch length, and 112 square feet of wall surface area. Each filter was exposed to 65 minutes of exhaust flow prior to data collection. The efficiency patterns across the particle size range exhibit the previously noted minimum in efficiency in the nanoparticle size range, as shown at low point 720 for curve 722 for the cordierite DPF. In contrast, there is no substantial drop in efficiency for the composite hybrid DPF of the present invention as shown at curve 724 having a substantially constant flat efficiency profile.

Figure 12:
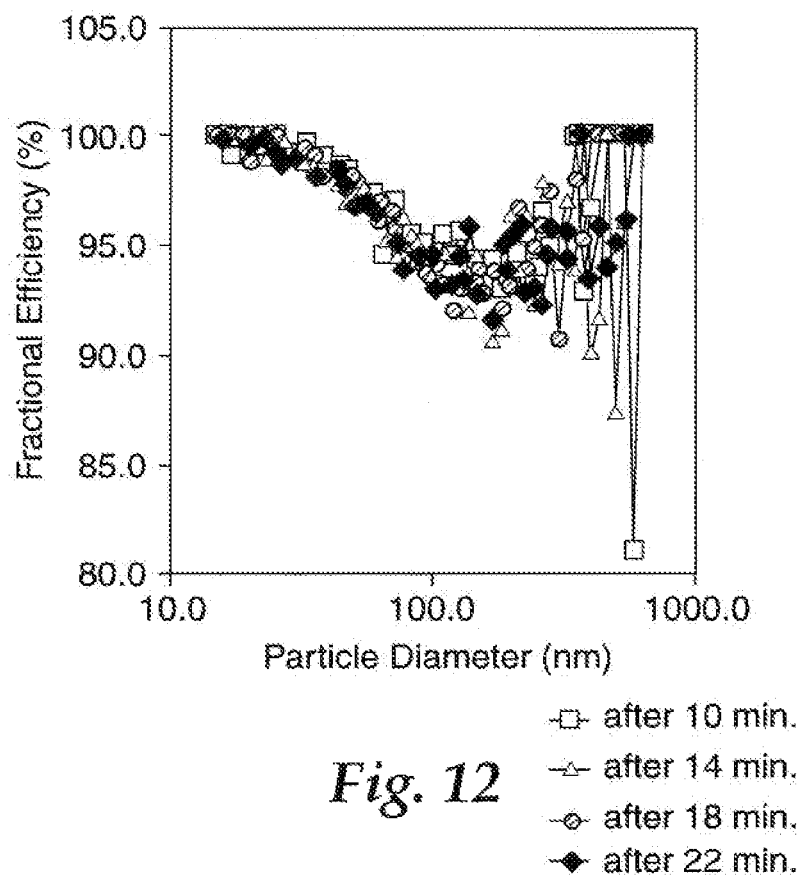

FIG. 12 shows the fractional efficiency of a second embodiment of a hybrid diesel particulate filter in accordance with the present invention, namely a hybrid filter having a 10.5 inch diameter, 9 inch length, 3.5 millimeter pleat height, and 54 square feet of wall face area during ISO Mode 6. This hybrid filter was tested at a wall face velocity 3.4 times higher than the 200 cpsi cordierite filter of FIG. 3. As with the test conditions in FIG. 3, the hybrid filter of FIG. 12 was loaded for a total of 100 minutes during testing at four previous Modes (namely Modes 8, 1, 6, 11), and the flow conditions were then allowed to stabilize for ten minutes at Mode 6. Fractional efficiency data was then collected every four minutes starting at the ten minute time and ending 22 minutes later. During this time, the soot laden DPF was regenerating and the data shows only a slight drop in removal efficiency over this time period, i.e. the filter has a substantially constant efficiency during regeneration, in contrast to FIG. 3.

Figure 13:
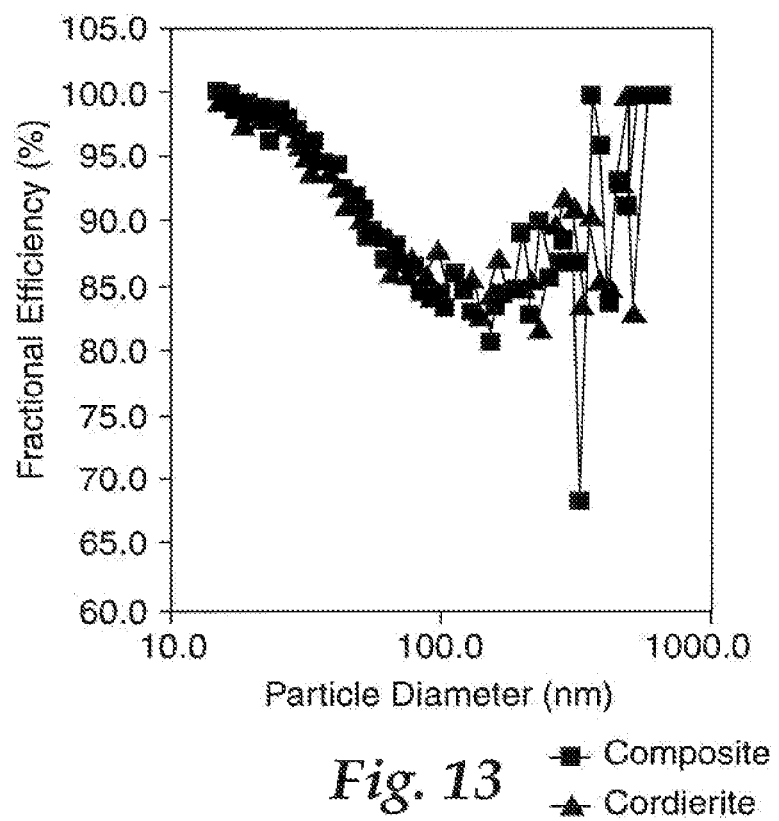

FIG. 13 compares the fractional efficiency of the hybrid filter of FIG. 12 to the cordierite filter of FIG. 3 during ISO Mode 8. Both filters started out clean. Flow conditions were allowed to stabilize for ten minutes before efficiency data was collected. For clean filters (under these conditions there was little soot accumulation), the hybrid filter exhibited about the same efficiency as the 200 cpsi granular cordierite filter despite the 3.4 times higher wall face velocity, i.e. despite the much higher wall face velocity through the hybrid filter, the efficiencies are about the same when the soot cake has not had time to fully develop on the cordierite filter.

In the data noted above, the clean 200 cpsi cordierite filter and the second noted embodiment 3.5 millimeter pleat height hybrid filter exhibit similar MPR efficiencies at ten minutes (ISO Mode 8). The MPR efficiency increases as soot loads. During regeneration in ISO Mode 6, the cordierite efficiency drops rapidly, while the hybrid efficiency changes more slowly. The efficiency oscillates between the initial efficiency (for clean and newly regenerated DPFs) and some higher efficiency (for fully established soot cake for cordierite and for a fully loaded hybrid filter). The difference in MPR efficiency behavior over time due to regeneration is due to differences in the mode of filtration of the two filters. Cordierite, with its low porosity, small pore size and low permeability, acts as a cake filter. MPR efficiency of a cake filter is governed by the properties of the soot cake and changes with cake development. As the soot cake is providing the filtration for the cordierite, one would expect a more rapid efficiency drop during burning of the cake. In contrast, the hybrid filter, with its higher porosity, larger pore size and permeability, acts as a depth filter. MPR efficiency of depth filters is primarily controlled by the properties of the filter media, i.e. collector size, surface area, surface roughness, porosity and thickness. For the hybrid depth filter, the media properties govern removal, hence the MPR efficiency drop is slower. Due to differences in the structure of the accumulated soot (as a cake in cordierite versus dispersed throughout the depth of the hybrid filter), combustion of the soot cake may also propagate faster in cordierite than the hybrid filter, also contributing to the observed change in efficiency.

A lower efficiency was observed for the noted second embodiment 3.5 millimeter pleat height hybrid filter of FIG. 12 than the noted first embodiment 3.0 millimeter pleat height hybrid filter of FIG. 11. This is due to a variety of effects. The difference in pleat height causes about a 37% higher wall face velocity for the second embodiment of FIG. 12 relative to the first embodiment of FIG. 11. Efficiency is inversely related to velocity. The difference in pleat height also influences the flow and soot distribution patterns within the element. The increased soot loading for the first embodiment of FIG. 11 relative to the second embodiment of FIG. 12 (at the time of data collection) means that the first embodiment hybrid filter accumulated more soot within its structure, which increases efficiency. It is anticipated that further development of these and other changes in the hybrid structure can desirably use these differences to advantage to achieve higher or lower MPR efficiency, for example larger/smaller pleat height, more/less refractory binder particles, higher/lower firing temperatures, smaller/larger diameter fibers, more/less porosity, etc., as described above, and as further described hereinafter.

Figure 14:
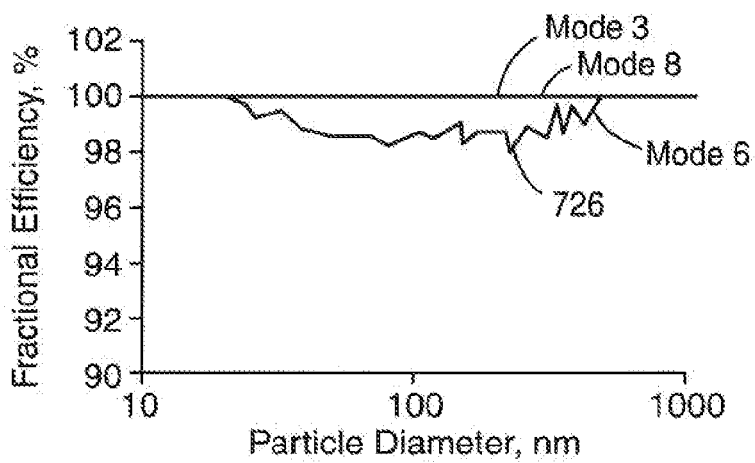
Figure 15:
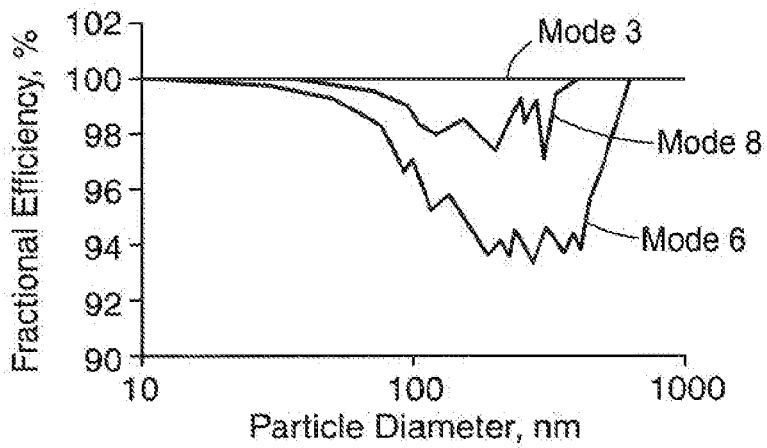
Figure 16:
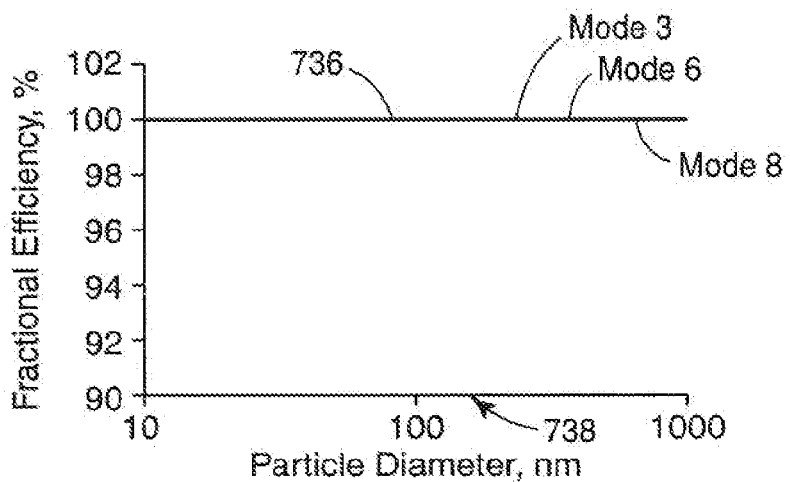

FIG. 14 shows the fractional efficiency of a granular cordierite DPF at ISO Modes 3, 6, 8. FIG. 15 shows the fractional efficiency of a granular SiC DPF at ISO Modes 3, 6, 8. FIG. 16 shows the fractional efficiency of a DPF of the noted first embodiment hybrid filter at ISO Modes 3, 6, 8. The SiC DPF was processed in accordance with the above noted CVI (Chemical Vapor Impregnation) process of U.S. patent application Ser. No. 09/935,847, filed Aug. 23, 2001, now U.S. Pat. No. 6,582,490. The hybrid filter is preferably processed in accordance with the above noted sol-gel process of International Patent Application No. PCT/US02/21333, filed Jul. 3, 2002, now International Patent Publication No. WO03/004438. The fractional efficiencies are generally high, but with some reductions in efficiency at ISO modes of high engine load, for example Mode 6 in FIG. 14 for the granular cordierite DPF, and Modes 6 and 8 in FIG. 15 for the silicon carbide diesel particulate filter. In FIG. 14, the efficiencies for ISO Modes 3 and 8 are substantially the same, and substantially constant across the range of particle diameters. In FIG. 15, the efficiency for ISO Mode 3 is substantially constant across the range of particle diameters. In FIG. 16, the efficiencies for ISO Modes 3, 6 and 8 are substantially the same, and substantially constant across the range of particle diameters. For the cordierite diesel particulate filter, FIG. 14, the lowest efficiency occurs during ISO Mode 6 due to regeneration, as shown at trough 726, with a minimum efficiency at a particle size range of approximately 100-250 nm. The SiC DPF also experienced its lowest efficiency during ISO Mode 6, as shown at trough 728, and with such minimum efficiency trough occurring at a particle size of approximately 250 nm. ISO Mode 6 has a high temperature (approximately 1000° C.) and a high flow rate that during regeneration, it is believed, damaged the surface cake of contaminant and disrupted the cake filtration. When the surface cake is disrupted in this manner, portions of the underlying filter structure, as opposed to the cake, perform the filtration. Each filter has its own particle size range of greatest penetration, with lowest efficiency. In contrast, the filter of FIG. 16 does not exhibit the noted efficiency drops of FIGS. 14 and 15, and instead is characterized by a substantially flat and constant efficiency profile, even at ISO Mode 6 which had caused the dips in efficiency in FIGS. 14 and 15.

Figure 17:
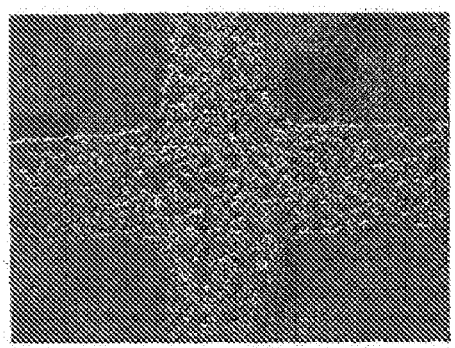
FIG. 17 is a cross-sectional microphotograph, at 50× (times) magnification, view of a monolithic cordierite diesel particulate filter.
Figure 18:
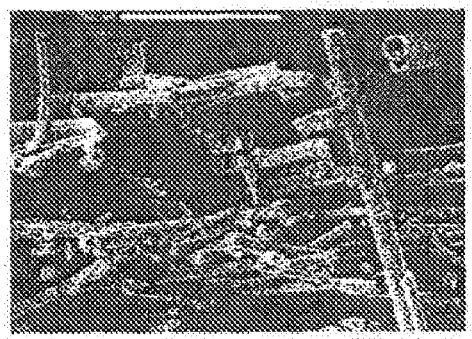
FIG. 18 is a cross-section microphotograph, at 500× magnification, of a silicon carbide coated alumina fiber diesel particulate filter.
Figure 19:
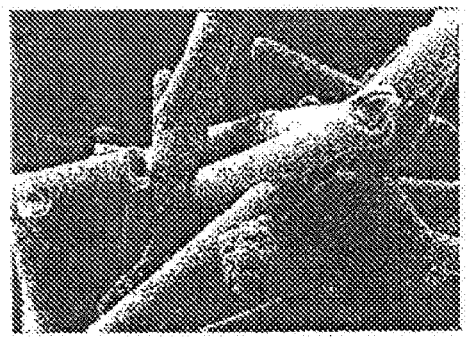
FIG. 19 is a microphotograph, at 1000× magnification, of a fibrous structure coated to a rough nodular textured coating, like FIG. 2.
Figure 20:
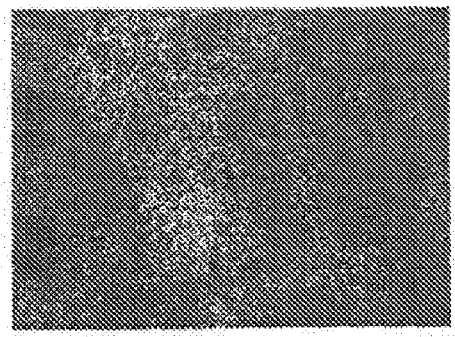
FIG. 20 shows a microphotograph, at 500× magnification, of a hybrid fibrous granular filter media with dendrites created using a CVI process similar to that disclosed in section I but with accelerated nucleation.
Figure 21:
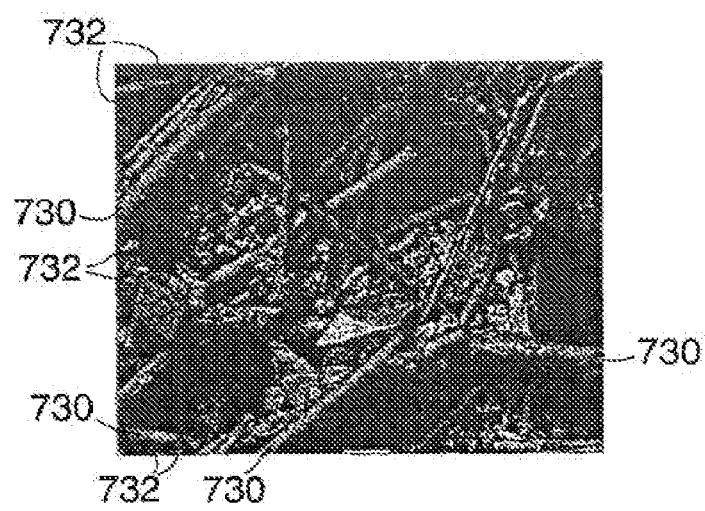
FIG. 21 is a microphotograph, at 750× magnification, of a sol-gel hybrid fibrous-granular filter structure.

FIGS. 17-21 show microstructures of various filter media. FIG. 17 shows a monolithic cordierite cross-section. FIG. 18 shows silicon carbide coated alumina fiber using the CVI (Chemical Vapor Impregnation) process of U.S. Pat. No. 6,582,490 above. FIG. 19 is a replication of FIG. 2 of U.S. Pat. No. 6,582,490 noted above, showing filter media using the CVI process disclosed in U.S. Pat. No. 6,582,490. FIG. 20 shows a hybrid fibrous granular filter media with dendrites using a CVI process similar to that disclosed in U.S. Pat. No. 6,582,490 but with accelerated nucleation. FIG. 21 shows a hybrid fibrous granular filter media using the sol-gel process noted above in International Patent Publication No. WO03/004438. Table 1 below is a comparison of various filter media, including: in the first column, the sol-gel hybrid media of FIG. 21 processed according to the above-noted sol-gel process; in the second column, a prior art fibrous media purchased from Matsushita Electric Industrial Company and which is believed to be the filter described in the above noted Mihara et al prior art; and in the third column, the cordierite monolithic granular media of FIG. 17.

TABLE 1

| Property | Sol-gel hybrid Media | Matsushita Fibrous Media | Cordierite Monolithic Media |
|---|---|---|---|
| Filter Bulk Density (g/cm$^3$) | 0.15–0.26 | ~0.23 | 0.46 |
| Pore Volume (cm$^3$/gm) | 2.96 | ~2 | 0.53 |
| Porosity (%) | 85 | 80 | 49 |
| Media Density (g/cm$^3$) | 0.38 | 0.5 | 1.2 |
| Median Pore Size (μm by Hg intrusion) | 40.4 | 28.1 | 14.2 |
| Open Pore Size (μm by Capillary Flow) | 11 | — | 6 |
| Permeability (m$^2$) | $8.00 \times 10^{-12}$ | — | $6.10 \times 10^{-13}$ |
| Inertial Resistance Coefficient (m$^{-1}$) | $7.40 \times 10^5$ | — | $5.40 \times 10^7$ |
| BET Surface (m$^2$/gm) | 2–4 | — | 0.18 |
| Media Surface (m$^2$/cm$^3$) | 0.5–2.4 | — | 0.20 |

In the microstructure of the present hybrid filter, diffusion is the dominant mechanism for the capture of nanoparticles, as noted above. Diffusional capture can be increased by increasing the surface roughness and available media surface area in the path of the particle. In comparison with the sol-gel hybrid filter media, granular filter media, e.g. cordierite and silicon carbide monolithic granular filters, and the Matsushita fibrous filter, have a more closely packed particulate structure, and hence, as shown in Table 1, have higher filter bulk density, lower pore volume, lower porosity, higher media density, lower median pore size, lower open pore size, lower permeability, higher inertial resistance coefficient, smaller BET surface, and smaller media surface. The hybrid fibrous granular filter obtains the advantages of both granular and fibrous media. The fibrous base uses fibers large enough to support the structure, but fine enough for nanoparticle filtration. Multiple granular-like particles, such as nanoclay particles and refractory particles extend out from the surface of the fibers, FIG. 21, providing structural support (strengthening and binding the matrix) and for enhanced removal efficiency of nanoparticles. This structure allows for small collector size while maintaining the preferred larger pore sizes. Because the grains are attached to the fiber surfaces and do not need to be self-closed, large pores will not collapse or be subject to the high restriction found in the other filters, like the Matsushita and cordierite filters. The granular portion of the hybrid filter media can be the result of a material composed of clay and silicon carbide particles. These particles bond to the fiber matrix, increasing the surface area and generating a hybrid composite structure that contains both fibers and particles, FIG. 21. A significant aspect to achieve nanofiltration is to provide depth media filtering of nanoparticles, providing high porosity, high permeability, high pore size, low density, with high surface roughness and internal surface area (e.g. BET, media surface). It is anticipated that further improved nanofiltration capability will be achieved by incorporating more refractory particles and nanoparticles (particles with a diameter of <about 1 micron) in the binder e.g silicon carbide, other carbides, borides, oxides, or other highly refractory compounds that have a surface area in excess of about 2 $m^2$/gm after processing, or more preferably in excess of about 30 $m^2$/gm. These particles increase the surface area of the collectors in the filter. A less refractory binder phase can be used to provide high surface area, however the bonding particle has a much lower free surface area after firing because the diffusion of atoms which allows bonding also causes a reduction in the surface area of the particles. In the present hybrid filter, the binders (both clay and SiC) are not sintering or reducing surface area as the binder in the above noted Mihara et al filter. Sintering reduces interparticle porosity. Addition of refractory nanoparticles that are not bonding agents greatly increases the surface area. Multiple impregnation steps can be used to obtain a desired surface area. A bonding agent (i.e. an agent which aids adhesion of the nanoparticles to the rest of the composite filter media) is used in conjunction with these, but the quantity of the bonding agent should be kept low relative to the refractory nanoparticles. Alternatively, a lower firing temperature could be used to fix high surface area nanoparticles. As many applications will use catalysts with maximum use temperatures <about 800° C., a lower firing temperature could be used and less refractory nanoparticles could be used to increase surface area. For further disclosure, reference is made to co-authored SAE Technical Paper 2002-01-0323 "Design, Development and Performance of a Composite Diesel Particulate Filter", Miller et al, SAE 2002 World Congress, Detroit, Mich., Mar. 4-7, 2002, incorporated herein by reference.

Of note is the increased surface area of the hybrid structure that results while maintaining high porosity. This translates into greater removal efficiency with reduced pressure drop. The lower filter bulk density for the hybrid structure provides the resultant DPF with lower thermal mass, thus requiring less heat to raise its temperature for regeneration. The other filters of Table 1 exhibit smaller median pore size and permeability than the hybrid media, and lower particle removal efficiency. This indicates that much of the pore structure of the other filters is not accessible to fluid flow. The high surface area of the hybrid structure provides benefits not only in terms of particle removal (particularly at nanoparticle sizes), but also in terms of catalyst application. High surface area catalyst wash coats are often applied to DPFs to facilitate soot regeneration. Typically, these wash coats have surface areas about 10 to 100 times greater than the DPF. When applied to the hybrid structure, less coating is needed. As seen in Table 1, the hybrid DPF media has lower filter bulk density, greater pore volume, greater porosity, less media density, greater median pore size, greater open pore size, greater permeability, lower inertial resistance coefficient, greater BET surface, and greater media surface. Of particular note in Table 1 is the dramatic increase in surface area per gram substrate of the hybrid media (2-4) over the cordierite granular media (0.18) and the silicon carbide granular media (0.28). The surface area increase of the hybrid media over the cordierite granular media ranged from a factor of about 11 to a factor of about 37. The surface area increase of the hybrid media over the silicon carbide granular media ranged from a factor of about 7 to a factor of about 22. This provides greater surface area for collection of contaminant or deposition of catalyst or sorbate material. This also enhances particle capture and efficiency. Further of note in Table 1 is the significant increase in pore volume of the hybrid media (2.96) over the cordierite granular media (0.53) and the silicon carbide granular media (0.29) and the Matsushita fibrous media (~2). The porous volume per gram substrate for the hybrid media increased by a factor of about 5 over the cordierite granular media, and increased by a factor of about 10 over the silicon carbide granular media, and by a factor of ~50% over the Matsushita fibrous media. Further of note in Table 1 is the greater media pore size of the hybrid media (40.4) over the cordierite granular media (14.2) and the silicon carbide granular media (9.8) and the Matsushita fibrous media (28.1). The media pore size for the hybrid media increased by a factor of nearly 3 over the cordierite granular media, and by a factor of 4 over the silicon carbide granular media, and by a factor of nearly 1.5 over the Matsushita fibrous media. These provide greater porosity and more volume for contaminant, catalyst, sorbate, etc. These also provide greater permeability and less restriction to flow through the substrate.

The following is a description of the sealant plug material at the alternately opposite ends of the axial flow channels, for wall-flow filters.

A ceramic plugging material is used to seal the alternate ends of the channels in the filter. The following procedure was used in the preparation of a material for this purpose. 17 grams of LUDOX® AM-30 colloidal silica from Dupont was mixed with 20 grams of tap water and thickened with 0.3 grams of BERMOCOLL™ E351FQ from Akzo Nobel. 5 grams of HYCAR® 26-315 acrylic latex from Noveon was added as an intermediate organic binder. 29 grams of Alcoa unground A2 calcined alumina was added along with 29 grams of Exolon ESK F500 silicon carbide and 37 grams of 48M tabular alumina from C-E Minerals with moderate low shear mixing. The viscosity of this mixture was measured using a Brookfield LVT viscometer with a number 4 spindle at 30 rpm and found to be roughly 1000 cps. Additional E351FQ of about 0.1 to 0.2 grams was added to the mixture to bring the viscosity to roughly 3000 centipoise. The material when dried to 150 C is water insoluble and has a moisture loss of roughly 25%. Upon subsequent calcining to 1000° C. or higher there is an additional 2-3% weight loss and the material bonds to form a high temperature refractory plug.

Other variations have been examined to reduce density and improve the theological properties of the material. In an improved example, the larger particle size tabular alumina is removed and a milled refractory fiber is used. In yet another improvement the theological properties are improved by the formation of a pseudoplastic gel structure. The viscosity behavior of the gelled mixture is such that the shear rate behavior yields a 5-10 fold or greater increase in viscosity with a ten fold reduction in shear rate. This is beneficial for the application of plug material, since the mixture thins during application and flows into the pleat voids, then thickens so that the plug material will not run out of the channel. An example of this formulation follows. 40 grams of 1042 silica sol from ONDEO-Nalco and 24 grams of HYCAR® 26-315 from Noveon are added to 160 grams tap water. To this mixture is added 50 grams of Enfil SM90-

SAB-T40 milled fiber from Thermal Ceramics Inc., 160 grams unground A2 alumina from Alcoa, 64 grams of F500 silicon carbide from Exolon Esk and 12 grams of Natka Kaolin clay from W. R. Grace. Finally 19 grams of AL20 colloidal alumina from Nyacol Technologies was added as the gel forming counterpart to the colloidal silica. This mixture is preferably mixed with a small Cowles blade at a medium shear rate. About 2 minutes mixing was required for the viscosity to build to the desired level of 3000 centipoise as measured with the Brookfield LVT viscometer and number 4 spindle at 30 rpm. When measured at 3 rpm, the viscosity is roughly 18,000 centipoise.

Other possible modifications include alternate refractory ceramic fibers of alumina, mullite, alumino-silicate or bio-soluble fiber and calcined powders of titania or zirconia in various granular sizes that tailor the density and thermal expansion of the final plug material.

The following is a description of the adhesive for bonding the pleated sheet at its pleat or bend lines to the flat sheet.

An inorganic binder material is used to bond between pleated and flat layers of media in the filter. This material is prepared by the addition of spray-dried alumina to a colloidal alumina with added particulates to form a thickened and sticky inorganic paste. In the primary example 55 grams of AL20SD spray-dried alumina from Nyacol Technologies is added to 250 grams AL20 colloidal alumina from Nyacol with high shear mixing to obtain a thoroughly dispersed material. 6 grams of F500 silicon carbide from Exolon ESK was also added for visual indication of application and to provide some small particulate in the interface. This mixture will thicken slightly over time but is initially 600-1200 centipoise as measured with the Brookfield LVT viscometer and number 4 spindle at 30 rpm.

Slightly higher or levels of AL20SD may be used to increase the viscosity and AL20 liquid may be added to lower viscosity. This mixture must be dried completely at a temperature of 150° C. before additional water based treatments are applied and will yield a weight loss of about 68%.

In addition to the nanofiltration aspects noted above, a further mechanism is provided for controlling nanoparticles emitted in diesel applications. Volatile gases, including hydrocarbons, may condense downstream of a DPF (diesel particulate filter) or DOC (diesel oxidation catalyst) giving rise to nanoparticles, as noted above. $SO_x$ and $NO_x$ are nanoparticle precursors. In order to control these sources of nanoparticles, the parent gases are removed. $SO_x$ is formed from sulfur compounds originally present in the fuel or lube oil. Upon combustion and/or oxidization by the DOC, $SO_x$ is formed, which continues to react to form sulfate nanoparticles. $NO_x$ is formed from $N_2$ gas during the combustion process or by the DOC. $NO_x$ further reacts to form nitrate nanoparticles. In order to control nanoparticle formation downstream of the DPF, one or more strategies are employed, including: the use of low sulfur fuels and lube oils to avoid the production of sulfate nanoparticles; the use of EGR (exhaust gas recirculation), SCR (selective catalytic reduction), and $NO_x$ adsorbers or other $NO_x$ control strategies to prevent the production of nitrate nanoparticles; the use of an oxidation catalyst, e.g. Pt (platinum), Pd (palladium), or other appropriate precious metal, to reduce the concentration of volatile hydrocarbons that condense to form nanoparticles. The nanoparticle filter used in conjunction with these strategies reduces or prevents the emission of nanoparticles by locating the nanoparticle filter at a point in the system where the gases have cooled enough that sulfates and/or nitrates form and can be removed by filtration and/or by coating the nanoparticle filter with an oxidization catalyst. Nanoparticles are removed by filtration and, at the same time, volatile hydrocarbons are oxidized to prevent the formation of hydrocarbon nanoparticles. This approach has the added benefit of lowering the soot regeneration temperature of the nanoparticle filter. In further embodiments, a DOC or a conventional prior art catalyzed DPF is placed either upstream or downstream of the nanoparticle filter to oxidize volatile nanoparticles and nanoparticle pre-cursors. Ideally, the DOC or catalyzed DPF would be upstream of the nanoparticle filter in order to decrease its contaminant loading and increase service life.

Catalyst may be applied to the nanofilter in several different ways, including: as a wash coat; incorporated into the hybrid filter as a component of the binder used to rigidify the structure and increase its surface area; or as a product of the combustion of a fuel-born diesel catalyst dissolved in the fuel and burned by the engine. A wash coat may tend to accumulate on the surface of the filter, rather than throughout the depth of the structure and at the channel ends where it is most needed. The fuel-born catalyst method does not suffer this drawback, but is less practical in a production environment because it requires running the engine and ideally careful monitoring, to ensure that catalyst is applied correctly.

In implementing the nanoparticle filter as part of an aftertreatment system, with any increase in particle removal efficiency, there is a risk of shortening the service life of the filter as the amount of contaminant captured per unit time is increased. In diesel emission control, this is undesirable, as either the time to filter-plugging or the time between filter regeneration cycles is shortened, with corresponding penalties in the form of service life, service costs and/or fuel economy. This can be minimized or avoided by using two DPF elements in series, with a primary DPF element not optimized for nanoparticle control (to capture and retain the larger diesel particulates), and a secondary DPF optimized for nanoparticle control. The primary and secondary DPFs may be present as two separate DPFs arranged in series and connected by appropriate plumbing or tubing, or two separate DPF elements mounted within a common housing and arranged in series, or a single DPF element with distinct sections for the control of coarse particles and for the control of nanoparticles. These embodiments are further discussed hereinafter. Either or both DPFs may be coated with an oxidization catalyst to lower regeneration temperature and to oxidize volatile hydrocarbons that may form nanoparticles upon cooling.

Use of the hybrid filter media enables construction of a filter (e.g., filter 10, FIG. 1 of U.S. Pat. No. 6,582,490; filters 210, 219, FIGS. 8-10 of International Patent Publication No. WO03/004438; filter 310, FIGS. 19, 20 of U.S. patent application Ser. No. 10/075,035, now U.S. Patent Publication No. US2003/0190269 A1; filter 400, FIG. 23 of U.S. Patent Publication No. US2003/0190269 A1; filter 502, FIG. 29 of U.S. Patent Publication No. US2003/0190269 A1) for filtering nanoparticles in a hot gas flowing along an axial flow direction (e.g., flow direction 32, FIG. 1 of U.S. Pat. No. 6,582,490; flow direction 402, FIGS. 23, 27, 28 of U.S. Patent Publication No. US2003/0190269 A1; flow direction 504, FIGS. 29-31, 33-35, 37 of U.S. Patent Publication No. US2003/0190269 A1), namely particles <about 1 micron in a gas greater than about 200° C. The filter includes a first sheet (e.g., sheet 12, FIGS. 1, 3, 5 of U.S. Pat. No. 6,582, 490; sheet 214, FIGS. 8, 9 of International Patent Publication No. WO03/004438; sheet 328, FIG. 19 of U.S. Patent Publication No. US2003/0190269 A1; sheet 408, FIGS. 24, 26 of U.S. Patent Publication No. US2003/0190269 A1;

sheet 514, FIGS. 29, 30, 32 of U.S. Patent Publication No. US2003/0190269 A1) and a second sheet (e.g., sheet 14, FIGS. 1, 3, 5, 7 of U.S. Pat. No. 6,582,490; sheet 216, FIG. 8 of International Patent Publication No. WO03/004438; sheet 324, FIGS. 19, 20 of U.S. Patent Publication No. US2003/0190269 A1; sheet 410, FIG. 24 of U.S. Patent Publication No. US2003/0190269 A1; sheet 516, FIGS. 29, 30, 32, 36 of U.S. Patent Publication No. US2003/0190269 A1). The second sheet has a plurality of pleats (e.g., pleats 16, FIGS. 1, 3, 5, 7 of U.S. Pat. No. 6,582,490; pleats 524, FIG. 30 of U.S. Patent Publication No. US2003/0190269 A1) defined by wall segments (e.g., wall segments 18, 20, FIGS. 1, 3 of U.S. Pat. No. 6,582,490; wall segments 320, 322, FIG. 19 of U.S. Patent Publication No. US2003/0190269 A1; wall segments 422, FIGS. 23-26 of U.S. Patent Publication No. US2003/0190269 A1; wall segments 526, 528, FIGS. 30, 31, 33-37 of U.S. Patent Publication No. US2003/0190269 A1) extending in zig-zag manner between pleat tips (e.g., pleat tips 22, 24, 26, FIGS. 1, 3 of U.S. Pat. No. 6,582,490; pleat tips 530, 532, 534, 536, FIG. 30 of U.S. Patent Publication No. US2003/0190269 A1) at axially extending bend lines (e.g., bend lines 424, FIGS. 23-25, 26 of U.S. Patent Publication No. US2003/0190269 A1; bend lines 538, 540, 542, 544, FIG. 30 of U.S. Patent Publication No. US2003/0190269 A1). The pleat tips on one side of the second sheet are in contiguous relation with and preferably adhesively bonded to the first sheet to define axial flow channels (e.g., flow channels 28, FIGS. 1, 3 of U.S. Pat. No. 6,582,490; flow channels 226, FIGS. 9, 10 of International Patent Publication No. WO03/004438; flow channels 318, FIG. 20 of U.S. Patent Publication No. US2003/0190269 A1; flow channels 430, FIGS. 23, 24, 26 of U.S. Patent Publication No. US2003/0190269 A1; flow channels 508, FIGS. 29, 32, 34, 35, 37 of U.S. Patent Publication No. US2003/0190269 A1). At least one and preferably both of the sheets are composed of the above noted hybrid filter media material composed of the combination, in the same sheet, of: a) fibrous filter media having a plurality of fibers 730, FIG. 19; and b) granular filter media having a plurality of granules such as particles 732 extending from the surfaces of the fibers. The fibers include ceramic fibers, and the granules are bonded to the fibers. Preferably, the granular filter media is composed of granules of ceramic nanoparticles bonded to the fibers. In the preferred embodiment, the granular filter media is formed as above, and is composed of agglomerates of ceramic particles bonded to and disposed so as to thereby bond together said fibers at spaced locations along and at intersections of said fibers, and further composed of an inorganic binder material having a ceramic component comprising at least one of a ceramic precursor material and a ceramic material, and in a further embodiment of a nano-clay material, and in yet further embodiments of agglomerates of ceramic particles bonded to and disposed so as to thereby bond together the fibers, the agglomerates of ceramic particles comprising a chemically stabilized β-cristobalite formed from pyrolyzed particles of montmorillonite clay. As noted, in the preferred embodiment the granules comprise non-sintered refractory particles bonded to the fibers. Further in the preferred embodiment, the granules comprise refractory nanoparticles bonded to the fibers with a strengthening bonding agent, and wherein the refractory nanoparticles are not bonding agents. Further in the preferred embodiment, the fibers include ceramic fibers, and the granules are non-sintered ceramic particles bonded to the fibers. Further in the preferred embodiment, the granular filter media is composed of agglomerates of particles bonded to and disposed so as to thereby bond together the fibers at spaced locations along and at intersections of the fibers and providing depth media filtering of nanoparticles. The depth media has BET surface >about 1.0 m$^2$/gm. The granules are in a binder comprising refractory nanoparticles having a surface area preferably >about 2 m$^2$/gm, and further preferably >about 30 m$^2$/gm. Further in the preferred embodiment, the fibrous filter media comprises refractory ceramic fibers, and the granular filter media comprises agglomerates of ceramic particles bonded to and disposed so as to thereby bond together the refractory ceramic fibers at spaced locations along and at intersections of the refractory ceramic fibers and diffusionally capturing nanoparticles at the noted locations and below the surface of the filter media sheet.

Further in the preferred embodiment, the nanoparticle filter has a permeability >about $3 \times 10^{-12}$ m$^2$ and an inertial resistance coefficient <about $1 \times 10^6$ m$^{-1}$, particularly when the hot gas is diesel exhaust flowing along the noted axial flow direction. The filter is impregnated with particles by a sol-gel process and the particles bonded to the fibers to form a rigidified filter material by heating. Alternatively, the filter is impregnated with silicon carbide by a CVI process and cured by heating to form a rigidified filter material. Further preferably, at least one of the noted sheets is coated with an oxidization catalyst to reduce concentration of gaseous contaminants that condense into nanoparticles at ambient temperature. The filter captures particles in the noted MPR (Most Penetrating Region) 712, 714, FIG. 2. The filter is characterized by a substantially constant efficiency profile 724, FIG. 11, 736, FIG. 16, in a plot of particle number efficiency vs. size of the particles, including diffusional capture of particles on the order of $10^1$ nm, FIGS. 2, 11, 16, inertial impaction and interception capture of particles on the order of $10^3$ nm, and diffusion and interception capture of particles on the order to $10^2$ nm, all at substantially the same efficiency, including in the MPR 724, 738 of the plot, FIGS. 11, 16. As above noted, the hot gas has a tri-modal particulate emission distribution, FIG. 1, namely a coarse mode with particle size on the order of $10^3$ to $10^4$ nm, an accumulation mode with particle size on the order of $10^1$ to $10^3$ nm, and a nuclei mode with particle size on the order of $10^1$ nm. The accumulation mode has the greatest mass of particles (dashed line 708 in FIG. 1), and the nuclei mode has the greatest number of particles (solid line 706 in FIG. 1). The efficiency of the present filter is substantially uniform, FIGS. 11, 16, in all of the noted coarse, accumulation and nuclei modes, including for particle size on the order of $10^2$ nm in the MPR. As above noted, the filter is regenerable to burn off collected contaminant, and in the preferred embodiment is further characterized by a substantially constant efficiency during regeneration, FIG. 12. Further in the preferred embodiment, the noted filter media of the filter has a porosity >about 85%. Further in the preferred embodiment, the noted filter media of the filter is further characterized by the following, in combination: pore volume >about 2.5 cm$^3$/gm; porosity >about 85%; median pore size >about 30 microns; open pore size >about 10 microns; BET surface >about 1.0 m$^2$/gm; and media surface >about 0.4 m$^2$/cm$^3$.

Figure 22:
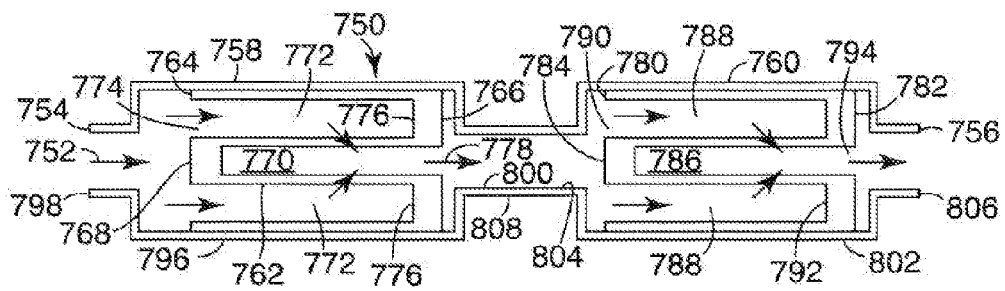
FIG. 22 schematically illustrates a filter system.

Referring to FIG. 22, a filter system 750 is provided for filtering nanoparticles in diesel exhaust flowing along an axial flow direction 752 from upstream at 754 to downstream at 756, the nanoparticles having a size <1 micron. The system includes a diesel exhaust treatment element 758, and a nanoparticle filter 760 in series with diesel exhaust treatment element 758 and filtering nanoparticles including particles in the MPR. In one embodiment, the diesel exhaust treatment element is a DPF (diesel particulate filter), preferably a wall-flow filter (such as a cordierite monolithic filter or a SiC CVI fibrous filter). Nanoparticle filter 760 is downstream of the DPF. In another embodiment, diesel exhaust treatment element is at least one of: a DOC, diesel oxidization catalyst; an $NO_x$, nitrous oxide, adsorber; and an SCR, selective catalytic reduction, catalyst.

In a further embodiment, filter system 750 filters nanoparticles and coarse particles in diesel exhaust flowing along axial flow direction 752, the coarse particles being larger than the nanoparticles. Element 758 is a coarse particle filter 762 (such as a cordierite monolithic filter or a SiC CVI fibrous filter) initially filtering the coarse particles in the diesel exhaust. Nanoparticle filter 760 is in series with and downstream of coarse particle filter 762 and receives diesel exhaust from coarse particle filter 762 after the noted initial filtering of coarse particles, such that the coarse particles do not clog nanoparticle filter 760, whereby nanoparticle filter 760 can be dominantly tailored to filtering nanoparticles. In one embodiment, nanoparticle filter 760 is tailored to filtering nanoparticles in the MPR, and coarse particle filter 758 is tailored to filtering particles outside of the MPR, e.g. above the MPR. In a further embodiment, an oxidization catalyst is provided in at least one of filters 762 and 760 to reduce concentration of gaseous contaminants that condense into nanoparticles at ambient temperature, and oxidizing volatile compounds that condense into nanoparticles, to prevent formation of nanoparticles therefrom, and aiding in regeneration of the filter. In the preferred embodiment, the catalyst is selected to oxidize volatile compounds selected from the group consisting of sulfates and nitrates. In one embodiment, the coarse particle filter is a wall-flow filter. In another embodiment, as noted above, the coarse particle filter is a granular structure monolithic DPF, diesel particle filter. In another embodiment, the coarse particle filter is a fibrous ceramic filter.

Nanoparticle filter 760 is constructed as noted above, including the noted first and second sheets, the second sheet having a plurality of the noted pleats defined by the noted wall segments extending in zig-zag manner between the noted pleat tips at the noted axially extending bend lines, the pleat tips on one side of the second sheet being in contiguous relation with and preferably adhesively bonded to the first sheet to define the noted axial flow channels, at least one of the sheets and preferably both comprising the noted hybrid filter media material composed of the combination, in the same sheet, of: a) fibrous filter media having a plurality of fibers 730; and b) granular filter media having a plurality of granules 732 extending from the surfaces of the fibers. Nanoparticle filter 760 captures particles in the MPR 712, 714, 724, 738, and has a permeability >about $3\times10^{-12}$ $m^2$ and an inertial resistance coefficient <about $1\times10^6$ $m^{-1}$.

Coarse particle filter 762 is constructed as described above, including the noted first and second sheets, the second sheet having the noted plurality of pleats defined by the noted wall segments extending in zig-zag manner between the noted pleat tips at the noted axially extending bend lines, the pleat tips on one side of the second sheet being in contiguous relation with the first sheet to define the noted axial flow channels, the wall segments extending axially between upstream and downstream ends 764 and 766, the wall segments being alternately sealed to each other by a first upstream set of plugs 768 to define a first set of flow channels 770 closed by the first set of plugs 768, and a second set of flow channels 772 interdigitated with the first set of flow channels and having open upstream ends 774, the wall segments being alternately sealed to each other by a second downstream set of plugs 776 closing the second set of flow channels 772, the first set of flow channels 770 having open downstream ends 778. Nanoparticle filter 760 is constructed as described above, including the noted first and second sheets, the second sheet having the noted plurality of pleats defined by the noted wall segments extending in zig-zag manner between the noted pleat tips at the noted axially extending bend lines, the pleat tips on one side of the second sheet of the nanoparticle filter being in contiguous relation with and preferably adhesively bonded to the first sheet to define the noted axial flow channels, the wall segments of the nanoparticle filter extending axially between upstream and downstream ends 780 and 782, the wall segments of the nanoparticle filter being alternately sealed to each other by a first upstream set of plugs 784 to define a first set of flow channels 786 closed by the first set of plugs 784, and a second set of flow channels 788 interdigitated with the first set of flow channels 786 and having open upstream ends 790, the wall segments of the nanoparticle filter being alternately sealed to each other by a second downstream set of plugs 792 closing the second set of flow channels 788, the first set of flow channels 786 having open downstream ends 794.

In the embodiment of FIG. 22, a first housing 796 has an upstream inlet 798 and a downstream outlet 800, and houses coarse particle filter 762 therebetween. A second housing 802 has an upstream inlet 804 and a downstream outlet 806, and houses nanoparticle filter 760 therebetween. Connector tube 808 connects outlet 800 of housing 796 to inlet 804 of housing 802.

Figure 23:
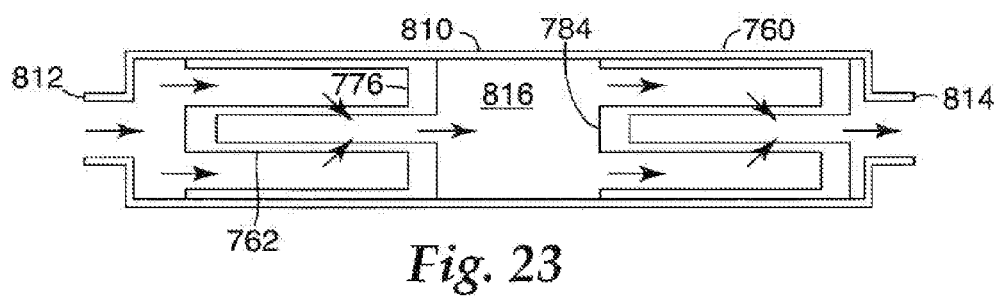
FIG. 23 is like FIG. 22 and shows another embodiment.

FIG. 23 shows another embodiment and uses like reference numerals from above where appropriate to facilitate understanding. In FIG. 23, a housing 810 has an upstream inlet 812 and a downstream outlet 814, and houses both coarse particle filter 762 and nanoparticle filter 760 therebetween in the same housing 810. Coarse particle filter 762 and nanoparticle filter 760 are separated by an axial gap 816 axially spacing the second set of plugs 776 of coarse particle filter 762 from the first set of plugs 784 of nanoparticle filter 760.

Figure 24:
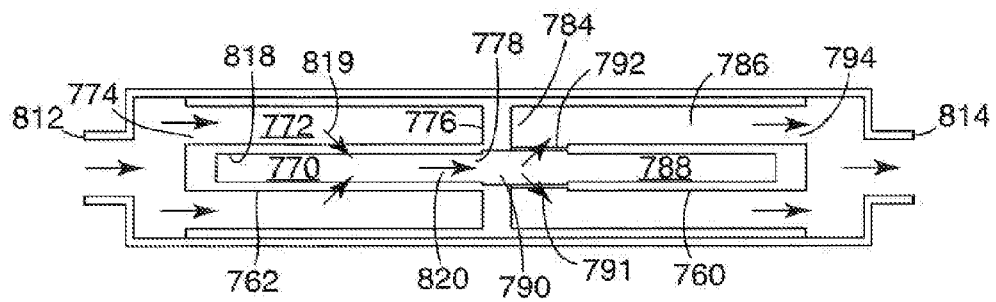
FIG. 24 is like FIG. 23 and shows another embodiment.

FIG. 24 shows a further embodiment and uses like reference numerals from above where appropriate to facilitate understanding. In FIG. 23, there is no axial gap 816 as in FIG. 23. Instead, in FIG. 24, the first set of plugs 784 of nanoparticle filter 760 is the second set of plugs 776 of coarse particle filter 762 such that nanoparticle filter 760 and coarse particle filter 762 share a common set of plugs and are axially contiguous thereat such that diesel exhaust flows from upstream inlet 812 then axially through the open upstream ends 774 of the second set of flow channels 772 of coarse particle filter 762 as shown at arrows 819, then through the wall segments 818 of coarse particle filter 762, then through the open downstream ends 778 of the first set of flow channels 770 of coarse particle filter 762, then directly axially, as shown at arrow 820, into open upstream ends 790 of the second set of flow channels 788 of nanoparticle filter 760 as shown at arrows 791, then through wall segments 792 of nanoparticle filter 760, then through the first set of flow channels 786 of nanoparticle filter 760, then through the open downstream ends 794, then to downstream outlet 814. Coarse particle filter 762 and nanoparticle filter 760 share the same noted first sheets and share the same noted second sheets. The first set of flow channels 770 of coarse particle filter 762 are axially aligned with and in open axial communication with the second set of flow channels 788 of nanoparticle filter 760. The second set of flow channels 772 of coarse particle filter 762 are axially aligned with the first set of flow channels 786 of nanoparticle filter 760 but blocked from axial communication therewith by the noted common set of plugs 776, 784. In a further embodiment, an oxidization catalyst coating is provided on at least one of the noted sheets of one or both of coarse particle filter 762 and nanoparticle filter 760, to reduce concentration of gaseous contaminants that condense into nanoparticles at ambient temperature and oxidizing volatile hydrocarbons to prevent formation of hydrocarbon nanoparticles.

The present invention provides a method for filtering nanoparticles in a hot gas, namely particles <about 1 micron in a gas >about 200° C., including providing a fibrous support network composed of a plurality of fibers 730, providing a plurality of granules 732 extending from the surfaces of the fibers, wherein both the fibers and granules withstand gas temperatures >about 200° C. and further preferably >about 450° C., as above noted. The granules are bonded to the fibers preferably without sintering. The granules are provided preferably as ceramic particles bonded to the fibers.

The invention further provides a method for treating diesel exhaust, including filtering nanoparticles <about 1 micron in the diesel exhaust and oxidizing volatile compounds selected from the group consisting of sulfates and nitrates to prevent formation of nanoparticles therefrom. In a further embodiment, the method involves oxidizing $NO_x$. In a further embodiment, the method involves oxidizing $SO_x$. In one embodiment, the oxidizing step is performed prior to the filtering step, e.g. the oxidization catalyst is upstream of the nanoparticle filter. In another embodiment, the oxidizing step is performed after the filtering step, e.g. the oxidization catalyst is downstream of the nanoparticle filter. In another embodiment, the oxidizing step is performed concurrently with the filtering step, e.g., the oxidization catalyst is provided on the nanoparticle filter. Further in accordance with the preferred method, the nanoparticles are filtered with the noted nanoparticle filter, and the nanoparticle filter is coated with an oxidization catalyst to oxidize volatile compounds to reduce concentration of gaseous contaminants that condense into nanoparticles at ambient temperature. In one embodiment, an oxidation catalyst coating is applied to the nanoparticle filter as a wash coat. In another embodiment, the oxidation catalyst coating is applied to the nanoparticle filter by vapor deposition. In another embodiment, the oxidation catalyst coating is applied to the nanoparticle filter as a product of combustion of fuel-born diesel catalyst. In a further embodiment, the nanoparticles are filtered with the nanoparticle filter, and the nanoparticle filter is provided with a catalyst oxidizing volatile compounds and oxidizing trapped soot and lowering the regeneration temperature of the nanoparticle filter.

The invention further provides a method for filtering diesel exhaust, including separating particle filtration into first and second serial stages, e.g. 758 and 760, optimizing the second stage for filtration of nanoparticles <about 1 micron, optimizing the first stage for filtration of particles larger than the nanoparticles, and passing the diesel exhaust initially through the first stage and then through the second stage.

It is recognized that various equivalents, alternatives and modifications are possible within the scope of the appended claims.

What is claimed is:

1. A hybrid filter media for filtering nanoparticles in a gas flowing through said hybrid filter media and having a gas temperature greater than about 200° C., said hybrid filter media comprising:

a) fibrous filter media having a plurality of fibers; and
   b) granular filter media comprising a plurality of particles extending from the surfaces of said fibers, wherein said hybrid filter media provides depth media filtering of nanoparticles.

2. The hybrid filter media according to claim 1, wherein the plurality of particles comprises refractory particles, or refractory nanoparticles, or a combination thereof.

3. The hybrid filter media according to claim 2, wherein the plurality of particles comprises refractory nanoparticles, said refractory nanoparticles are not bonding agents for the hybrid filter media.

4. The hybrid filter media according to claim 1, wherein a portion of the particles in the plurality of particles has a particle surface area available for nanoparticle filtration, said particle surface area available for nanoparticle filtration being greater than about 2 $m^2$/gm.

5. The hybrid filter media according to claim 1, further comprising an oxidation catalyst.

6. The hybrid filter media according to claim 1, wherein the fiber matrix comprises ceramic fibers.

7. A filter comprising the hybrid filter media of claim 1.

8. A hybrid filter media for filtering nanoparticles in a gas flowing through said hybrid filter media and having a gas temperature greater than about 200° C., said hybrid filter media comprising a fiber matrix and a plurality of particles bonded to the fiber matrix, said hybrid filter media having a permeability greater than about $3 \times 10^{-12}$ $m^2$ and an inertial resistance coefficient less than about $1 \times 10^6$ $m^{-1}$.

9. The hybrid filter media according to claim 8, wherein at least a portion of the plurality of particles is formed from a mixture of clay and silicon carbide particles.

10. The hybrid filter media according to claim 8, wherein a portion of the particles in the plurality of particles comprise refractory nanoparticles having a particle surface area available for nanoparticle filtration, said particle surface area available for nanoparticle filtration being greater than about 30 $m^2$/gm.

11. The hybrid filter media according to claim 8, wherein (i) the fiber matrix comprises ceramic fibers, and (ii) the plurality of particles comprises refractory nanoparticles, said refractory nanoparticles having a particle surface area available for nanoparticle filtration.

12. The hybrid filter media according to claim 8, wherein the hybrid filter media has a pore volume greater than or equal to about 2.5 $cm^3$/gm.

13. The hybrid filter media according to claim 8, wherein the hybrid filter media is in the form of a first sheet.

14. A filter comprising the hybrid filter media according to claim 13, wherein the first sheet is bonded to a second sheet.

15. The filter according to claim 14, wherein said filter is a wall-flow filter.

16. A hybrid filter media for filtering nanoparticles in a gas flowing through said hybrid filter media and having a gas temperature greater than about 200° C., said hybrid filter media comprising (i) a fiber matrix, (ii) an inorganic binder formed from a mixture of clay and refractory particles, and (iii) a plurality of refractory nanoparticles bonded to the fiber matrix, the inorganic binder, or both, wherein at least a portion of the plurality of refractory nanoparticles have a particle surface area available for nanoparticle filtration.

17. The hybrid filter media according to claim 16, wherein the inorganic binder comprises β-cristobalite and silicon carbide.

18. The hybrid filter media according to claim 16, wherein the hybrid filter media has a permeability greater than about $3 \times 10^{-12}$ and an inertial resistance coefficient less than about $1 \times 10^6$ m$^{-1}$.

19. The hybrid filter media according to claim 16, wherein the fiber matrix comprises ceramic fibers, and said particle surface area available for nanoparticle filtration is greater than about 2 m$^2$/gm.

20. A filter comprising the hybrid filter media of claim 16.

* * * * *

UNITED STATES PATENT AND TRADEMARK OFFICE
CERTIFICATE OF CORRECTION

PATENT NO.        : 7,235,124 B2
APPLICATION NO.   : 11/333737
DATED             : June 26, 2007
INVENTOR(S)       : Z. Gerald Liu It is certified that error appears in the above-identified patent and that said Letters Patent is hereby corrected as shown below:

On the title page item (60), Col. 1 (Related U.S. Application Data) – Line 6-7 – After "Pat. No. 6,444,006," delete "said application No. 10/325,001".

On the title page item (60), Col. 1 (Related U.S. Application Data) – Line 8-9 – After "filed on" delete "Jan. 25, 2002," and insert -- July 3, 2002, --, therefor.

On the title page item (60), Col. 1 (Related U.S. Application Data) – Line 10 – After "Feb. 12, 2002," insert -- which --.

Column 1 – Line 12 – After "PCT/US02/21333," delete "Jan. 25, 2002," and insert -- July 3, 2002, --, therefor.

Column 5 – Line 51 – Delete "$f_1$:" and insert -- $f_i$: --, therefor.

Column 5 – Line 66 – Delete "$w_1$:" and insert -- $w_i$: --, therefor.

Column 6 – Line 19 (Approx.) – Delete " $\dfrac{\upsilon_0 d_k}{\nu}$ " and insert -- $\dfrac{\upsilon_0 d_h}{\nu}$ --, therefor.

Column 6 – Line 55 (Approx.) – Delete " $\gamma \overline{\upsilon_w^2}(0),$ " and insert -- $\gamma \overline{\upsilon_w}^2(0).$ --, therefor.

Column 12 – Line 53 – Delete "theological" and insert -- rheological --, therefor.

Column 12 – Line 56 – Delete "theological" and insert -- rheological --, therefor.

UNITED STATES PATENT AND TRADEMARK OFFICE
CERTIFICATE OF CORRECTION

PATENT NO.        : 7,235,124 B2
APPLICATION NO.   : 11/333737
DATED             : June 26, 2007
INVENTOR(S)       : Z. Gerald Liu It is certified that error appears in the above-identified patent and that said Letters Patent is hereby corrected as shown below:

Column 21 – Line 6 – In Claim 18, after "$3 \times 10^{-12}$" insert -- $m^2$ --.

Signed and Sealed this

Eighth Day of July, 2008

JON W. DUDAS
*Director of the United States Patent and Trademark Office*